US008827814B2

(12) United States Patent
Lemay et al.

(10) Patent No.: US 8,827,814 B2
(45) Date of Patent: Sep. 9, 2014

(54) SCREEN CAPTURE TO A MOBILE DEVICE

(75) Inventors: Steven G. Lemay, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 142 days.

(21) Appl. No.: 13/333,669

(22) Filed: Dec. 21, 2011

(65) Prior Publication Data

US 2013/0165199 A1 Jun. 27, 2013

(51) Int. Cl.
*A63F 13/31* (2014.01)
*A63F 13/71* (2014.01)

(52) U.S. Cl.
USPC ............................................... 463/42; 463/16

(58) Field of Classification Search
USPC .................................... 463/16–20, 40, 42, 43
See application file for complete search history.

(56) References Cited

U.S. PATENT DOCUMENTS

| | | | | |
|---|---|---|---|---|
| 6,270,410 | B1 | 8/2001 | DeMar et al. | |
| 6,676,522 | B2 | 1/2004 | Rowe et al. | |
| 7,611,409 | B2 | 11/2009 | Muir et al. | |
| 8,187,104 | B2 * | 5/2012 | Pearce | 463/43 |
| 2005/0288090 | A1 * | 12/2005 | Thomas et al. | 463/20 |
| 2006/0046849 | A1 | 3/2006 | Kovacs | |
| 2006/0205458 | A1 | 9/2006 | Huber | |
| 2007/0202941 | A1 | 8/2007 | Miltenberger et al. | |
| 2007/0268360 | A1 * | 11/2007 | Ahlgren | 348/14.01 |
| 2008/0009344 | A1 | 1/2008 | Graham et al. | |
| 2008/0070671 | A1 | 3/2008 | Okada | |
| 2008/0076572 | A1 | 3/2008 | Nguyen et al. | |
| 2008/0189604 | A1 * | 8/2008 | Washburn et al. | 715/255 |
| 2008/0311971 | A1 | 12/2008 | Dean | |
| 2009/0098943 | A1 | 4/2009 | Weber et al. | |
| 2009/0131145 | A1 * | 5/2009 | Aoki et al. | 463/20 |
| 2009/0131177 | A1 * | 5/2009 | Pearce | 463/43 |
| 2011/0111862 | A1 * | 5/2011 | Allen et al. | 463/42 |
| 2011/0183749 | A1 * | 7/2011 | Allen et al. | 463/25 |
| 2012/0028718 | A1 * | 2/2012 | Barclay et al. | 463/42 |

FOREIGN PATENT DOCUMENTS

| | | | |
|---|---|---|---|
| EP | 1 630 754 | 3/2006 | |
| WO | WO-03/027970 | 4/2003 | |
| WO | WO-2009/026320 | 2/2009 | |
| WO | WO-2009/042563 | 4/2009 | |
| WO | WO-2009/089124 | 7/2009 | |
| WO | WO-2009/108820 | 9/2009 | |
| WO | WO-2010/048591 | 4/2010 | |
| WO | WO-2010/105088 | 9/2010 | |
| WO | WO-2010/115063 | 10/2010 | |
| WO | WO 2010115063 A1 * | 10/2010 | G07F 17/32 |

OTHER PUBLICATIONS

U.S. Appl. No. 13/156,903, filed Jun. 9, 201.
U.S. Appl. No. 13/157,166, filed Jun. 9, 2011.

(Continued)

*Primary Examiner* — Bach Hoang
(74) *Attorney, Agent, or Firm* — Foley & Lardner LLP

(57) ABSTRACT

A gaming system compatible with patron-controlled mobile devices, such as smart phones or tablet computers, is described. The gaming system can be configured to convert a presentation of an outcome of a wager-based game played on an electronic gaming machine (EGM) into a social media presentation that can be uploaded to a social media site. In one embodiment, a copy of an image showing the outcome of the wager-based that is output on an EGM can be incorporated into the social media presentation. Then, the social media presentation can be uploaded from the EGM to a player's mobile device or directly to a social media site.

32 Claims, 12 Drawing Sheets

(56) References Cited

OTHER PUBLICATIONS

U.S. Appl. No. 13/217,105, filed Aug. 24, 2011.
U.S. Appl. No. 13/217,110, filed Aug. 24, 2011.
U.S. Appl. No. 13/220,430, filed Aug. 29, 2011.
U.S. Appl. No. 13/333,659, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/335,613, filed Dec. 22, 2011.
U.S. Appl. No. 13/426/479, filed Mar. 21, 2011.
Extended European search report and written opinion regarding EP Application No. 12198019.7, mail date Apr. 24, 2013, 8 pages.

* cited by examiner

SCREEN CAPTURE TO A MOBILE DEVICE

BACKGROUND

1. Field of the Described Embodiments

The described embodiments relate generally to gaming systems, such as gaming systems deployed in a casino enterprise. More particularly, apparatus and method for using a mobile device with a wager-based electronic gaming machine are described.

2. Description of the Related Art

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino.

In the loyalty program, the promotions can be tailored to the patron's preferences. As an example, if preferred, a patron can choose to receive promotional credits for game play on an electronic gaming machine and information regarding this preference can be stored to an account associated with the loyalty program. In general, information regarding the patron's preferences in regards to promotions as well as other activities within the casino enterprise, such as food, drink and room preferences, can be stored to their account associated with the loyalty program. The patron information stored in the account can be used to personalize the service and the game playing experience provided by the casino enterprise.

An ever increasing portion of patrons that visit casinos are regularly carrying mobile devices, such as smart phones, laptops, netbooks and tablet computers, on their person. The mobile devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in a mobile wallet applications and 6) a means of capturing information, such as video images and audio recordings. Thus, mobile devices, such as smart phones, are becoming essential tools and in some instances, the primary electronic interface for many individuals. The popularity of mobile devices allows for the possibility of utilizing their capabilities to further personalize and enhance the gaming experience in a casino gaming environment beyond what is currently performed with loyalty programs.

As described above, social media applications are popular on mobile devices. People utilize social media sites and their associated applications to connect with family and friends to share in their personal experiences. A trip to a casino, such as a trip to a casino in Las Vegas is a big event for many individuals. Thus, it is experience that they wish to share with their friends. The ability to share their highlights of a trip, such as the excitement associated with visiting a destination city, such as Las Vegas, can add to their overall gaming experience during the trip. In view of the above, methods and apparatus are desired that allow that allow gaming experiences, such as gaming experiences associated with the play of a wager-based gaming machine, to be shared via a social media site.

SUMMARY OF THE DESCRIBED EMBODIMENTS

A gaming system compatible with patron-controlled mobile devices, such as smart phones, netbooks, laptops, tablet computers, smart cards and memory sticks, is described. The gaming system can include gaming devices, such as electronic gaming machines and system servers. The electronic gaming machines (EGMs) can be configured accept cash or an indicia of credit that can be used to make wagers on the wager-based games. The EGMs can be deployed in a regulated casino environment.

In one embodiment, an EGM can be configured to generate social media presentation components from a game outcome presentation for a wager-based game played on the EGM. The social media components can be used to generate a social media presentation that can be posted to a social media site. For example, when a large jackpot is won on a video EGM, the EGM can be figured to select one or more images from the game outcome presentation that is output to a display on the EGM, such as an image showing the game outcome that resulted in the large jackpot. The selected images can be used as social media presentation components in a social media presentation.

A social media presentation can include social media presentation components in multiple media formats. For instance, a social media presentation can include one or more still images, video clips and sound clips from a game outcome presentation. The social media presentation components can be combined with contextual information, such as information about the person, place and time, and then formatted to generate the social media presentation. For instance, a first social media presentation can include a plurality of images selected from a game outcome presentation and text describing the type of game on which the jackpot was won, the casino where it was won, the casino's location and information about the person that won the jackpot, such as their name. In another example, a second social media presentation can include an embedded video clip can be from a game outcome presentation including sound. After the second social media presentation is posted to a social media site, friends of the jackpot winner can select and view the social media presentation, such as the embedded video clip.

After a social media presentation and/or social media presentation components are generated on a gaming device, such as an EGM, communication mechanisms can be provided that enable the social media presentation to be uploaded to a social media site. For example, the social media presentation can be uploaded from an EGM to a remote server where it can be retrieved. In another example, a communication connection can be established between the EGM and the mobile device that allows the EGM to upload the social media presentation directly to the mobile device. In yet another example, the user can supply social media site information, such as user account information that allows the social media presentation to be directly uploaded to the user's account.

One aspect of the embodiments described herein is related to an electronic gaming machine (EGM). The EGM can include a secure cabinet, a display mechanism, a value input mechanism, a value output mechanism, a wireless interface and a network interface and a game controller including a processor and a memory. The display mechanism can be coupled to the secure cabinet and can be configured for displaying an outcome to a wager-based game. The value input mechanism can be configured for receiving cash or indicia of credit used where the received cash or the indicia of credit are stored within the secure cabinet. The cash or indicia of credit can be converted to credits and used for making wagers on the outcome to the wager-based game;

The value output mechanism can be configured for dispensing cash or indicia of credit redeemable for cash or game play on another EGM. The wireless interface can be configured for communications with a user-controlled mobile device. The network interface can allow for communications between the EGM and a remote server. The game controller can be disposed within the secure cabinet and communicatively coupled to the display mechanism, the value input mechanism, the value output mechanism, the wireless interface and the network interface.

The game controller can be configured to: 1) determine the outcome to the wager-based game, 2) determine an award associated with the game outcome; 3) generate a presentation that reveals the outcome to the wager-based including the award; 4) control a plurality of mechanisms including the display mechanism to output the presentation; 5) receive a request for a social media presentation that includes a visual representation of the outcome of wager-based game including the award similar to presentation output on the EGM; 6) generate the social media presentation; 7) establish secure communications with a user-controlled mobile device and 8) send a copy of the generated social media presentation to the user controlled mobile device.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
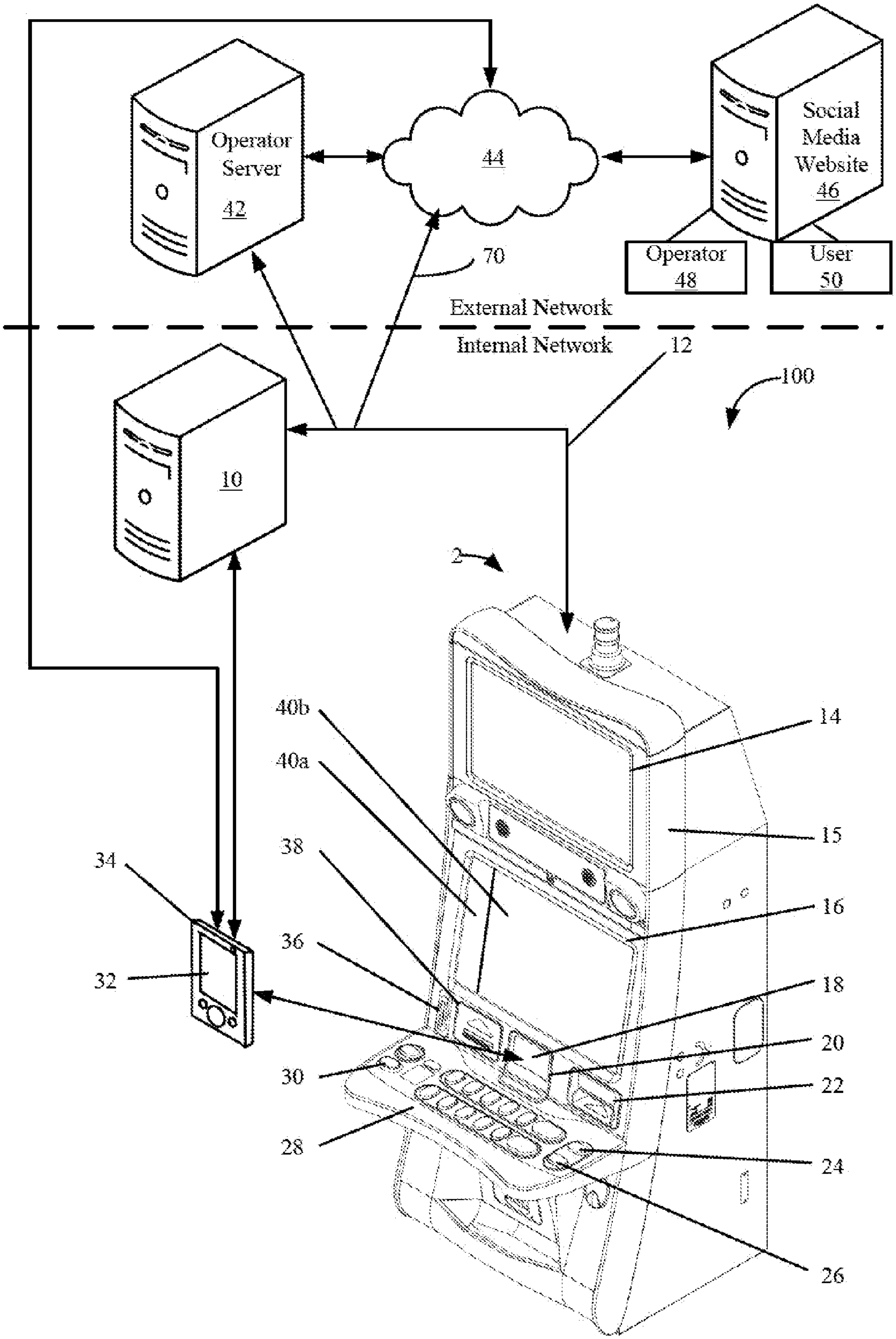
FIG. 1 is a perspective drawing of a gaming system, including a wager-based gaming machine and a system server where the system server and/or wager-based gaming machine are configured to communicate with patron controlled mobile devices and generate a social media presentations that can be uploaded to an operator site or a social media site in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with mobile devices controlled by users of the gaming system is described. The mobile devices can be configured to transmit and receive information used on a wager-based EGM. For instance, the mobile devices can store and transmit virtual ticket voucher information to an EGM that is used to deposit or remove credits from an EGM as part of cashless system. As another example, the mobile devices can be used to transmit player tracking information, such as a loyalty program account number, that initiates a player tracking session on the EGM.

In particular embodiments, the gaming system can be configured to generate a social media presentation that can be displayed on a social media site. The social media presentation can include social media presentation components derived from game outcome presentations from one or more wager-based games played on a single EGM or a group of EGMs. Devices in the gaming systems, such as the EGMs and/or servers can be configured to communicate with mobile devices. In some instances, the EGM or the servers can be configured to information from the mobile device that affects a social media presentation generated on an EGM or a server. For example, the information that is received from the mobile device can affect 1) the conditions under which a social media presentation is generated, 2) a format of the social media presentation that is generated, 3) a destination to which the social media presentation is uploaded (e.g., a particular social media site) and/or 4) recipients that are ultimately allowed to access the social media presentation.

As an example, an EGM can receive information from a mobile device that specifies a jackpot threshold for generating a social media presentation and formatting parameters to use in generating the social media presentation, such what information to include in the social media presentation. When the jackpot threshold is exceeded, the EGM can be configured to generate a social media presentation including information about the jackpot, such as a copy of an image showing the jackpot being won on the EGM according to the specified formatting parameters. After the social media presentation is generated, it can be uploaded directly to a social media site, uploaded to a server and made available for retrieval or uploaded to a player's mobile device. On the server or on the player's mobile device, applications can be provided that allow the social media presentation to be additionally modified before it is posted to a social media site.

With respect to the following figures, methods and apparatus that allow an EGM or another gaming system component to generate a social media presentation and interact with a mobile device are described. In particular, with respect to FIG. 1, interactions between a mobile device and an EGM and/or system server that affect the generation of a social media presentation related to the play of a wager-based game are described. With respect to FIGS. 2A, 2B and 2C, different instantiations of communication pathways that allow information associated with the generation of a social media presentation to be communicated between a mobile device, an EGM and a server are described. Processes for creating and uploading a social media presentation including components related to the play of wager-based game are described in FIG. 3. With respect to FIGS. 4A, 4B and 4C, methods and apparatus for generating a social media presentation associated with the play of a mechanical, video or multi-layer display gaming machines are discussed. In addition, a few examples of social media presentations are described.

Figure 5:
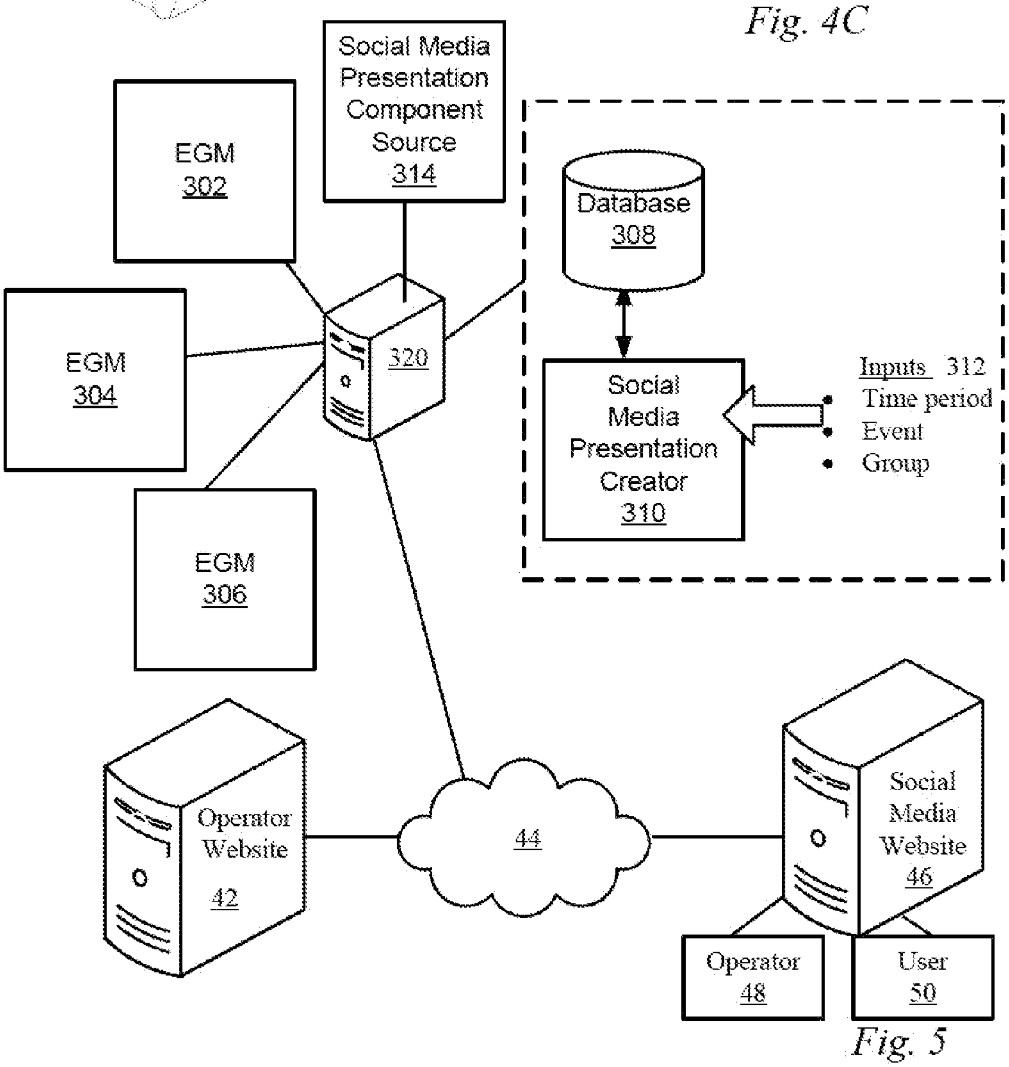
FIG. 5 is a block diagram illustrating a gaming system for generating a social media presentation and uploading to a remote server in accordance with the described embodiments.

A gaming system including a server configured to generate a social media presentation using a game outcome received from an EGM and software for recreating the game outcome presentation on the EGM is discussed with respect to FIG. 5. Social media presentations can include presentation components derived from multiple individuals playing wager-based games on different EGMs. An example of social media presentations including social media presentation components associated with multiple individuals is discussed with respect to FIG. 6. In FIG. 7, a block diagram of a screen from a mobile device configured to execute a social media application is described.

Figure 8:
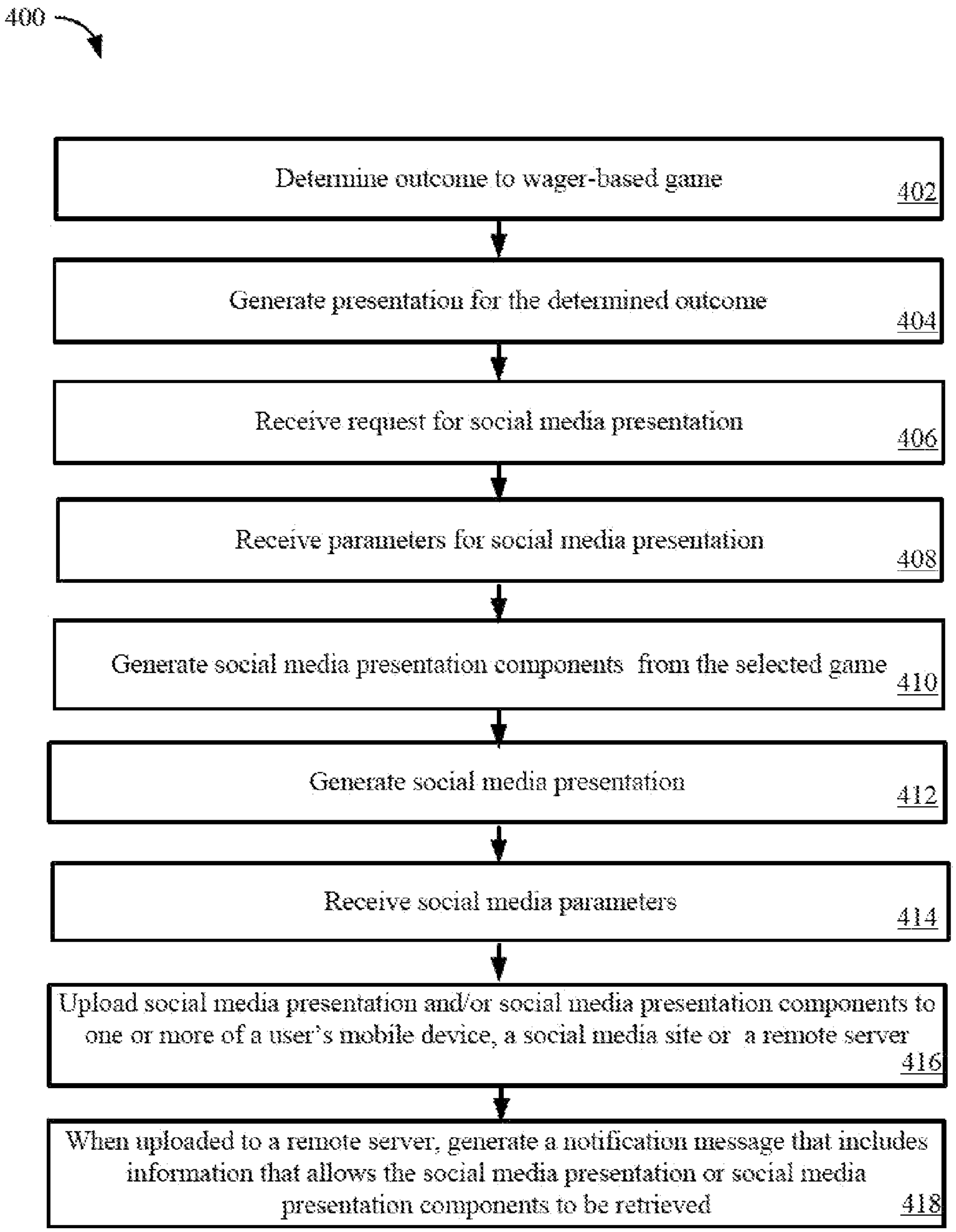
FIG. 8 is a method in a wager-based EGM for generating a social media presentation in accordance with the described embodiments.
Figure 9:
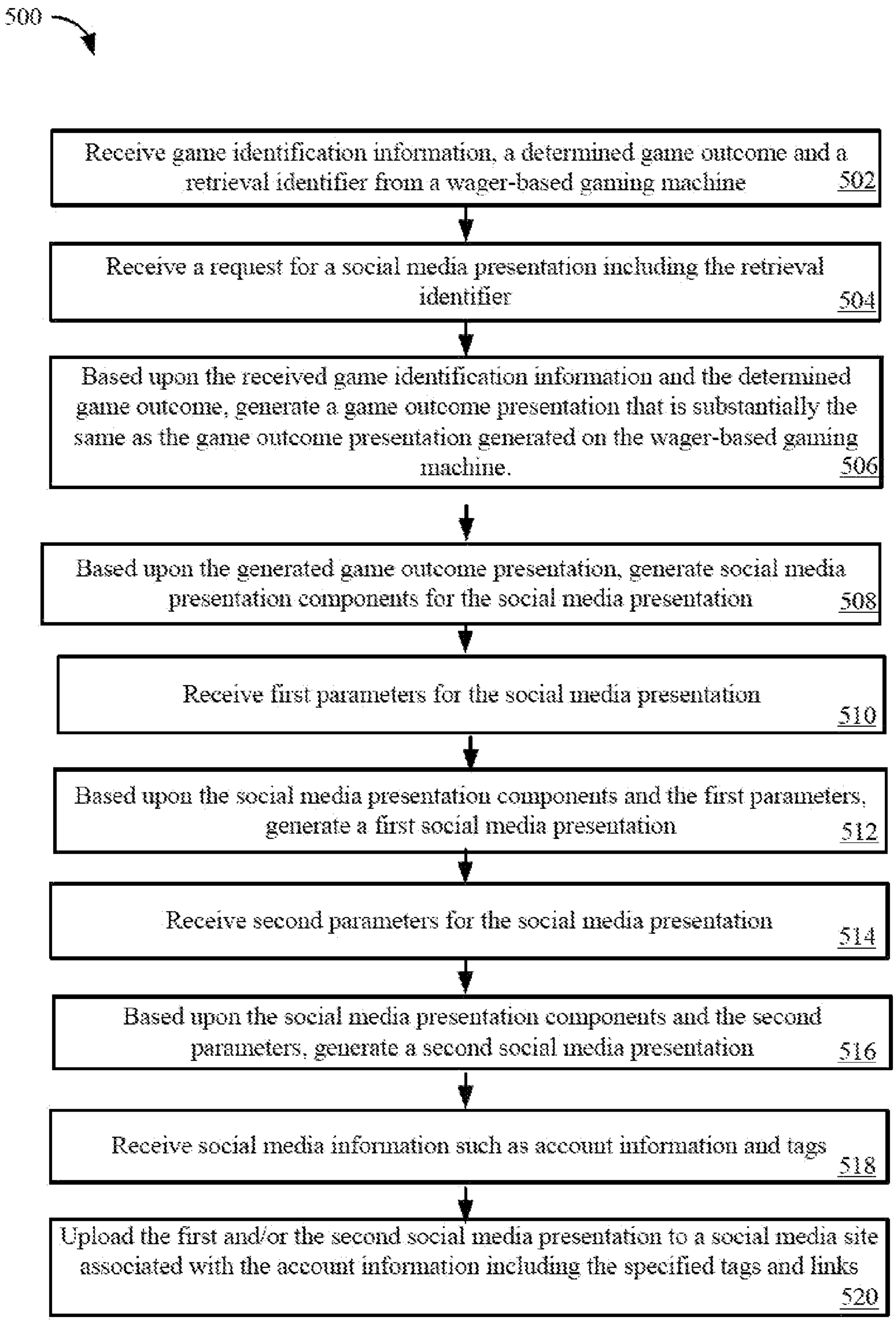
FIG. 9 is a method in a server for generating a social media presentation in accordance with the described embodiments.
Figure 10:
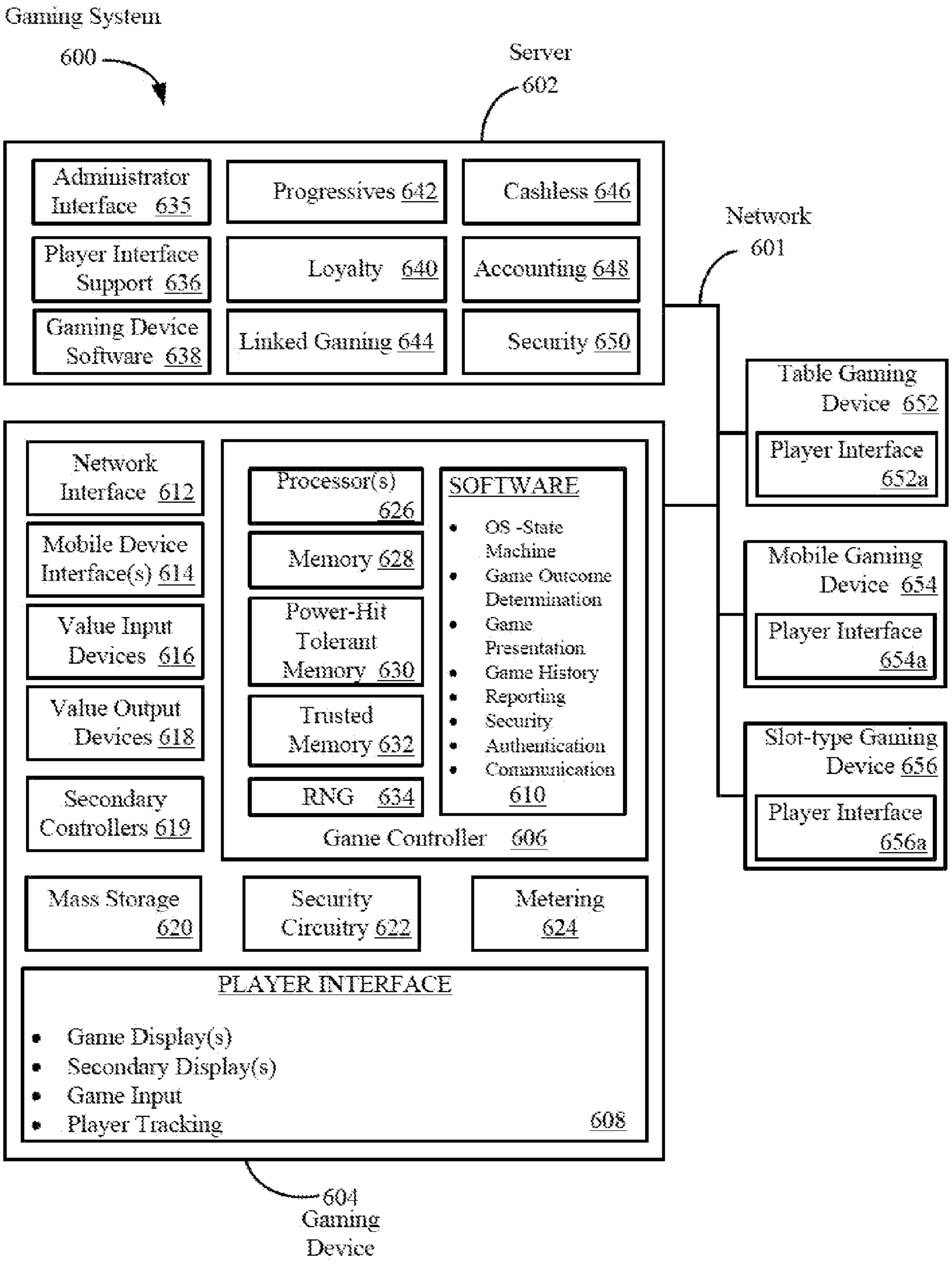
FIG. 10 shows a block diagram of a gaming device in accordance with the described embodiments.
Figure 11:
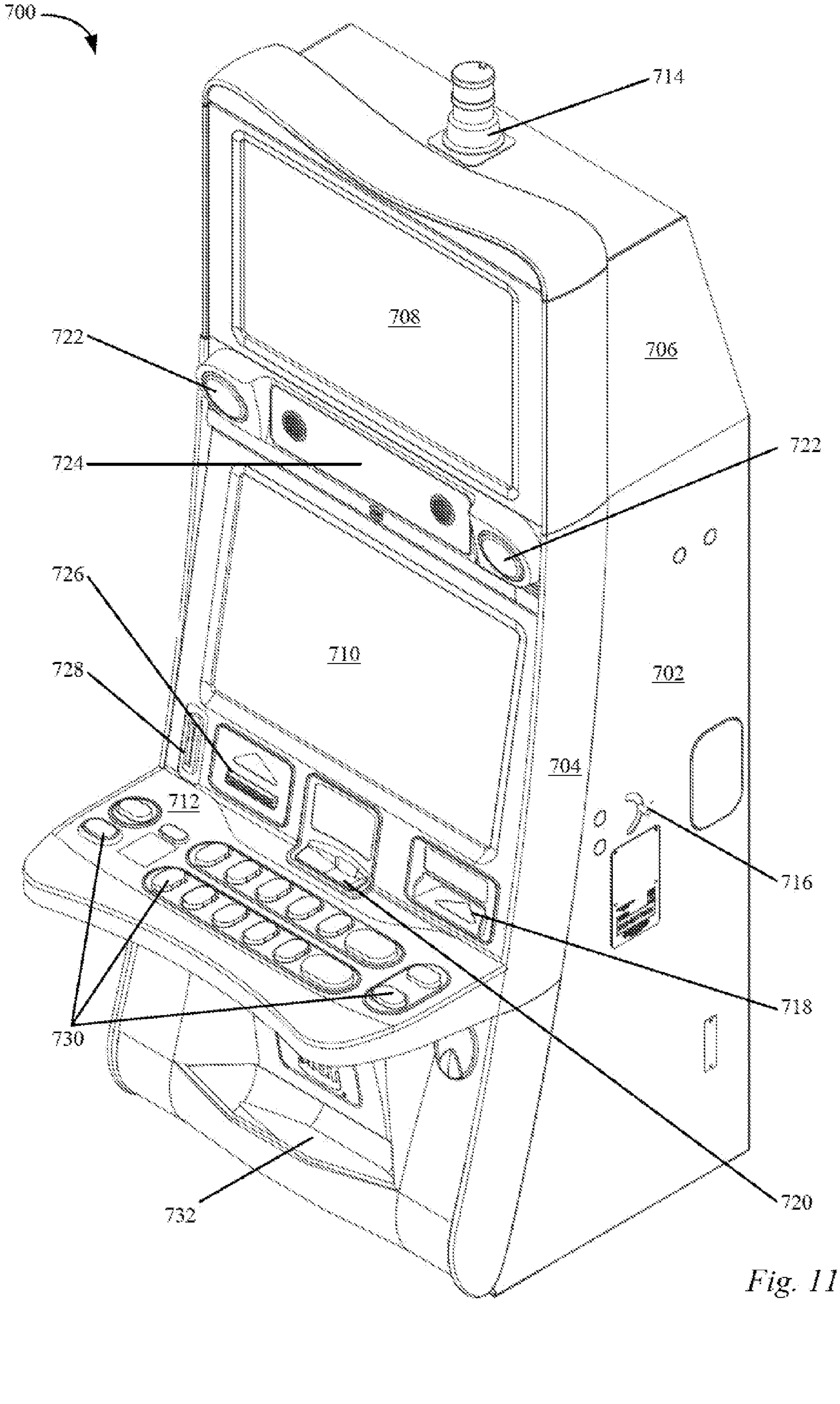
FIG. 11 shows a perspective drawing of a gaming device in accordance with the described embodiments.

With respect to FIGS. 8 and 9, methods in a wager-based EGM and a server, respectively, for generating a social media presentation are discussed. In FIGS. 10 and 11, a block diagram of a gaming device including internal components and a perspective drawing of a gaming device are shown. Additional details of wager-based gaming and gaming devices that can generate social media presentations and/or social media presentation components are described with respect to FIGS. 10 and 11.

Social Media Presentation Generation in a Gaming System

In the current section, a wager-based gaming system compatible with social media applications is described. In particular, one or more gaming devices in the gaming system can be configured to capture information related to a gaming experience. The information, such as images generated during a game outcome presentation presented on a wager-based gaming machine, can be used to generate a social media presentation. For example, an image from a game outcome presentation showing a win of a large jackpot can be used in a social media presentation that is posted to a social media site. To allow the social media presentation to be posted to a social media site, the gaming system can include communication mechanisms that link gaming devices in the gaming system to devices outside of the gaming system, such as remote servers associated with the social media site.

With respect to FIG. 1, first, devices within a gaming system and their interactions with devices outside of the gaming system related to social media applications are described. Second, a first example of a social media application involving interactions between a user and a table game are described. Then, a second example of a social media application involving interactions between an electronic gaming machine (EGM) and a user is discussed.

FIG. 1 shows a gaming system 100 providing social media compatible applications. The gaming system 100 can be located within a gaming enterprise, such as a casino. The gaming system 100 includes a gaming system server 10 coupled to a wager-based electronic gaming machine (EGM) 2. The gaming system server 10 is coupled to the EGM 2 via an internal network 12. The gaming system 100 with a single server 10 and a single EGM 2 is provided for the purposes of illustration as other gaming systems compatible with the embodiments described herein can include multiple servers linked to multiple EGMs.

The gaming system 100 can be compatible with mobile devices, such as a user or operator controlled mobile device. Although, as described in more detail below, the gaming system 100 can provide social media related applications without the use of a mobile device. Mechanisms can be provided that allow a mobile device 34 to communicate with gaming devices in the gaming system. For instance, EGM 2 can include a wireless interface 18 and/or a wired interface (not shown) that enables bi-directional communications between the mobile device 34 and the EGM 2 or uni-directional communications from the EGM 2 to the mobile device 34. As another example, the server 10 can include a communication interface that allows bi-directional or uni-directional communications between the mobile device 34 and the server 10. Additional details of the communications between a mobile device 34 and the gaming system 100 are described in the next section with respect to FIGS. 2A, 2B and 2C.

As described above, in one application, a social media presentation derived from activities of a user within the gaming system 100 can be posted to an account at a social media site (e.g., Facebook™, Google+™ or Twitter™ account). To allow information, such as a social media presentation, to be posted to a social media site, communications can be provided that allow a transfer of information from the gaming system 100 to devices located outside of the system. One link providing outside communications can be between the gaming system 100 and the mobile device 34. For instance, a gaming device, such as server 10 or EGM 2, can communicate information related to a social media application to mobile device 34. Then, the social media information can be posted to a social media site 46 via a connection between the mobile device 34 and the Internet 44, such as via a 3G/4G data network provided by the mobile service provider.

In another example, the internal network 12 can provide access to an operator device, such as 42, that sits outside of the internal network. For example, the server 10 or the EGM 2 can post social media related information to server 42 and provide a user with a link to the information on the server 42. For example, the EGM 2 can send social media related information to server 42 and output a link, such as URL link, to the information. Via the URL link, the user can view and retrieve the social media presentation information sent to device 12. Then, if the user desires, the user can post the retrieved social media presentation information to their account 50 at the social media account 50.

In yet another example, a user can provide social media account information that allows social media information to be posted directly from a gaming device in system 100, such server 10 or EGM 2, to the social media site. Using the social media account information, social media information can be routed from the internal network 12 of gaming system 100 via a link, such as 70, to the external network 44. For instance, the EGM 2 can receive social media account information for a player's Facebook™ account and then send a message including social media information generated on the EGM, such as information related to a big win to the user's account 50 at social media site 46. If specified by the user, the information can be posted directly to their "wall" on Facebook™ where other authorized Facebook™ users can view the information. Also, the message can include information that changes a "status" associated with the account. For instance, a status on their Facebook™ account 50 can be changed to "I am so happy, I just won a large Jackpot at a slot machine" in response to receiving the message including the social media information from the EGM 2.

Besides being configured to post social media information to a user's account on a social media site, the gaming system 100 can be configured to post social media information to an operator account at a social media site via a link from the internal network 12 to an outside network. For instance, after a big win occurs, the EGM 2 can be configured to post social media information, such as a social media presentation including information about the win, to the operator's account 48 at the social media site 46. Then, from the operator's account, other users at the site with connections to the operator's account, such as "friends" of the operator or users that "like" the operator can be notified. For instance, the "friends" can be notified if someone wins a multimillion Megajackpots™ award.

In addition, a message from the EGM 2 including the social media information may also be sent to a manufacturer's account associated with the manufacture of EGM 2. Then, social media information included in the message can be sent to individual or viewed by individuals connected with the manufacturer via the manufacturer's social media account at site 46. In particular embodiments, the EGM 2 (or another device in the gaming system 100) can be configured to send messages including the social media information to only the operator's account 48, to user's account 50 only, or to multiple accounts at the social media site 46, such as the user's account 50, the operator's account 48 and/or the EGM manufacturer's account (not shown) simultaneously. In addition, messages including social media information can be sent to user accounts at multiple social media sites. For instance, a first message can be sent to a Twitter™ account and a second message can be sent to a Facebook™ account.

As described above, the gaming system 100 can support social media applications that generate social media information in response to interactions between users and gaming devices within the system. Types of gaming devices that may be linked in the system 100 include but are not limited to video EGMs, mechanical reel type EGMs, multi-layer display EGMs and table games (e.g., black jack, roulette, craps, etc). At the gaming devices, social media information can be captured, formatted and transferred to a location where it is accessible to a user. In general, mechanisms, such as image capture devices, can be provided to capture information about any activity, gaming related or non-gaming related, that can occur when a user interacts with the gaming system 100. The captured information can be converted to social media information and posted to a social media account associated with a social media site.

In a first example, a table game (not shown) can include an image capture device or other mechanisms for capturing information about the game played at the table and an interface for accepting social media account information that is coupled to the internal network 12. For example, a camera can be positioned above the table, such that outcomes of games played on the table can be captured in images from the camera. In response to certain events, such as but not limited to a user request, social media information related about the game play at the table can be captured and transferred to a user controlled or user accessible device. For example, after a big win at black jack, a player can request a social media presentation to be generated from an image of the table showing the win and payout. A device coupled to the gaming system 100, such as a tablet computer, can receive the image and generate a social media presentation including the image. The social media presentation can also include information about the win, such as where it took place and at what date.

Via the tablet computer, the user can view the social media presentation and optionally modify it, such as to change the presentation format. Then, in one embodiment, the user can enter information into the tablet computer that allows the social media presentation to be uploaded to their social media account. In another embodiment, the user can securely pair their mobile device with the tablet so that the social media presentation is transferred from the tablet to their mobile device. Then, from their mobile device, the user can upload the social media presentation to accounts of their choosing.

In other embodiments, a gaming experience from which social media information is generated can result when a user interacts with an EGM in system 100, such as EGM 2. During game play, in response to a user request or as a result of determination made on the EGM 2, information related to the interaction between the user and EGM 2 can be captured and converted into a format that is compatible with posting to a social media site. Some details of user-EGM 2 interactions are described as follows with respect to FIG. 1.

A user with a mobile device 34 can approach EGM 2 to play a wager-based game. The EGM 2 includes an upper video display 14 and lower video display 16 disposed in a secure cabinet 15 with locking mechanisms. The lower video display 16 can be used to display video images associated with the play of a wager-based game, such as a game outcome presentation. The upper video display 14 can be used to display attract features and a bonus game outcome presentation that is triggered from the play of the wager-based game on the lower video display 14. One or both of the upper video display 14 and main display 16 can include touch screens.

In one embodiment, a portion of the video display screens can be allocated for control a remote device, such as server 10. The remote server 10 can control video content output the portion of the display it controls to provide additional features on the EGM 2. For instance, in one embodiment, the remote server 10 can output video content related to a social media application. The social media application can be output in the portion of a display screen that it controls. Via the application, which is described in more detail as follows, a player may be able view and modify a social media presentation generated on the EGM 2. The portion of a display controlled by a remote server can be referred to as a "service window." Additional details of service windows are described with respect to FIGS. 10 and 11.

As an example of allowing a remote device to control a portion of the EGM display, video content for a portion 40*a* of display screen 16 can be controlled by server 10. Thus, the server 10 can send instructions and data that determine what content is output in portion 40*a*. The remaining portion 40*b* can be controlled by a game controller (not shown, see FIG. 10). In portion 40*b* and/or on display 14 as well, the game controller can output video content associated with the play of a wager-based game.

To start game play, credits are first deposited on the EGM that can be used for wagers. For instance, currency or a ticket voucher redeemable for credits can be inserted in bill acceptor 22. The ticket voucher can be validated by a remote server in the gaming system 10. As another example, information can be transferred from the mobile device 34 to the EGM 2 via an interface, such as wireless interface 18. The mobile device 34 can be configured as an electronic wallet and the information transfer can be used to initiate an electronic funds transfer that results in credits being deposited on the EGM 2. This type of transaction can also be initiated from information stored on a smart card or magnetic striped read via card reader 36 after a user inserts a card in card reader 36.

After depositing credits, a player can initiate a player tracking session on the EGM 2. During a player tracking session, information associated with game play, such as amounts wagered and amounts won can be stored to a player tracking account. This information is often referred to as player tracking information. To encourage repeat business, gaming enterprises often provide complimentary awards ("comps"), such as free meals and lodging, to players. The value of the comp can depend on the value of the player to the casino based upon their player tracking information, such as amounts wagered over time.

The player tracking account can be associated with the user that has initiated game play on EGM 2 and can be hosted on a remote device, such as server. The player can initiate a player tracking session by providing player tracking account information that allows their player tracking account to be located on a device that hosts player tracking accounts. In one embodiment, the player tracking account information can be stored on the mobile device 34 and transmitted to the EGM via a compatible communication interface, such as wireless interface 18. In another embodiment, the player tracking account information can be stored on a card that can be read by card reader 36. In yet another embodiment, a service window application, such as an application output to display portion 40*a*, can be used to enter player tracking account information.

In one embodiment, information related to a social media application can be stored to the player tracking account. For instance, information related to a format preference for a social media presentation generated on the EGM 2 can be stored in the player tracking account. In another example, a thresh-hold for triggering the generation of a social media presentation, such as a jackpot amount thresh-hold, can stored in the player tracking account. In yet another example, social media account information that enables a device, such as EGM 2, to upload social media information to a social media site can be stored in the player tracking account. When the player tracking session is initiated, the information related to social media applications can be downloaded to the EGM 2. In other embodiments, the information related to social media applications can be stored on the player's mobile device 34. The information stored on the mobile device 34 can be transferred to the EGM 2 before the user begins game play, during game play or after game play has been completed.

After depositing credits, a player can make a wager and initiate a game on the EGM 2. The input panel 28, which can include mechanical buttons, such as 24, 26 and 28, can be used to make selections related to the play of the game, such as a wager amount, and initiate the game. After the game is initiated, a game outcome presentation can be generated on EGM 2. It can include video images output to the displays and accompanying sound effects. For example, during a video slot game played on EGM 2, the game controller can generate a game presentation including a series of video images that show at different times an amount wagered on the game, symbols moving and then stopping in a final position and an award amount associated with game based upon the amount wagered and the final position of the symbols.

While the game outcome presentation is being output, the EGM 2 can be configured to save information associated with the game outcome presentation that can be used in a social media presentation, such as but not limited to still images, sounds or video clips. Each element from the game outcome presentation that is saved for use in a social media presentation can be referred to as a social media presentation object. The EGM 2 can include logic for capturing one or more social media presentation objects from a game outcome presentation.

As an example of capturing social media presentation objects from a game outcome presentation, a first social media presentation object captured can be an image showing a state of the EGM 2 just prior to the game being initialized. A second social media presentation object captured can be an image of an intermediary state displayed on the EGM after the game is initiated but prior to the game outcome being displayed, such as an image showing reels including symbols in a non-final position. A third social media presentation object captured can be an image showing the outcome to the game, such as the final position of the reels of video slot reel game, and an associated award. A fourth social media presentation can be a video image from a bonus game output to a secondary display that was triggered from the base game shown on a main display. A fifth the social media presentation object can be an audio clip including sounds associated the game outcome presentation. In different embodiments, different numbers of social media presentation objects and types of social media presentation objects can be captured and this example is provided for the purposes of illustration only.

After one or more social media presentation objects are captured, a social media presentation can be generated that uses the objects. For instance, if each of a number of objects captured is a still image, a social media presentation can be generated that includes each of the still images arranged as a single image. In one embodiment, the social media presentation using the social media presentation objects can be generated on the EGM 2 and then uploaded to a remote device, such as the player's mobile device 34. In other embodiments, the social media presentation objects can be transferred to a remote device and then the social media presentation can be generated from the objects on the remote device. For instance, the social media presentation objects can be transferred to the player's mobile device 34 and an application executed on the player's mobile device can be used to generate the social media presentation.

In one embodiment, social media objects captured from multiple games can be captured and incorporated into social media presentation. For instance, during a game play session on a single EGM, such as 2, via an input device on the EGM, the user can choose to capture social media presentation objects from different games. The social media presentation objects can be stored and then at the end of a game playing session, a social media presentation including the social media presentation objects captured from the multiple games can be generated.

In another embodiment, social media presentation objects captured from different EGMs can be uploaded to a remote device, such as a player's mobile device. For instance, different social media presentation objects can be captured different EGMs on separate days. Later, an application executing on the remote device can be used to generate one or more social media presentations using the objects. The one or more social media presentations that are generated can be uploaded to a social media site.

At the end of a game play session, such as when the credits on the EGM 2 reach zero or the user indicates they wish to cash out remaining credits, a social media presentation and/or social media presentation objects can be transferred to a remote device. In one embodiment, the social media presentation and/or social media presentation object can be transferred to a user's mobile device 34. After transfer, the presentation and/or objects can be displayed on the display screen 32 of the device.

The transfer of a social media presentation or presentation objects to a remote device can also occur during game play session on a game by game basis. For instance, the EGM 2 can be configured to select games or receive an input indicating a selection of a game for which to create a social media presentation objects and/or a social media presentation. In response, when a particular game is selected, the social media presentation objects and/or the social media presentation can be generated. Then, a transfer of the generated presentation objects and/or presentation can be initiated. During the transfer process, the user can continue to play games on the EGM 2.

The social media presentation objects and/or the social media presentation can be uploaded to other devices besides the mobile device 34. For example, the presentation and/or presentation objects can be uploaded to a remote device, such as the operator server 42. After upload, the EGM 2 can output a record locator that allows the uploaded presentation or presentation objects to be located on the remote device. As described above, the objects can be generated from multiple games. For example, a ticket can be printed from ticket printer 38 that includes a URL to the social media presentation and/or objects stored on the operator server 42. In another example, a record locator, such as a link, can be displayed on the EGM 2. In another example, a QR code or some other optically formatted data encoding a record locator can be displayed to an EGM display, such as in window portion 40*a* or 40*b*. Then, an image capture mechanism on the mobile device can be used to capture optically formatted data. The record locator information encoded in the optically formatted can be translated to allow the social media presentation and/or objects stored on a remote device, such as server 46, to be located.

A remote device storing a social media presentation or presentation objects uploaded from an EGM can include tools for manipulating a previously generated presentation or creating a new social media presentation from uploaded presentation objects. The tools may allow a user to format a social media presentation or add additional details, such as textually formatted information. Also, the tools can also include an interface that allows the social media presentation to be saved so that the social media presentation objects and/or generate presentations can be retrieved at a later time. In addition, an interface can be provided that allows a generated social media presentation to be uploaded to a social media site.

As described above, social media presentations can include social media presentation objects. The presentation objects can include but are not limited to still images (e.g., a copy of a frame buffer), video clips and audio clips representative of gaming content output on an EGM. In one embodiment, the still images, video clips and audio clips can be uploaded to a remote site. In another embodiment, rather than uploaded objects, such as still images, information representative of the EGM states at different times during a game selected for a social media presentation can be uploaded to the remote device. The state information in combination with a copy of the software logic used to generate a game outcome presentation on the EGM can be used by the remote device to generate presentation objects. Details of state generation in an EGM are described in more detail with respect to FIGS. 10 and 11.

As an example, the EGM 2 can select a particular game to use in a particular game outcome presentation. Then, the EGM 2 can upload to a remote server such as information related to a credit amount on the machine prior to the win, a determined outcome for the game prior to the selection of the particular game, a determined outcome for the selected game, information identifying the EGM (e.g., model number, manufacturer), information related to the specific game (e.g., name version) and contextual information (e.g., time and place where the game occurred). Based upon the received information, the server can be configured to identify presentation software for the identified and recreate the presentation output on the EGM using the identified presentation software. The recreated presentation can include sounds and images that were output on the EGM for the selected game and the previous game. Social media presentation objects and a social media presentation can then be generated from the recreated presentation. In one embodiment, an interface can be provided on the server that allows a user to scroll through the recreated presentation in a frame by frame basis and select still images for use in the social media presentation.

Communications Between and EGM, a Mobile Device and a Server

Figure 2A:
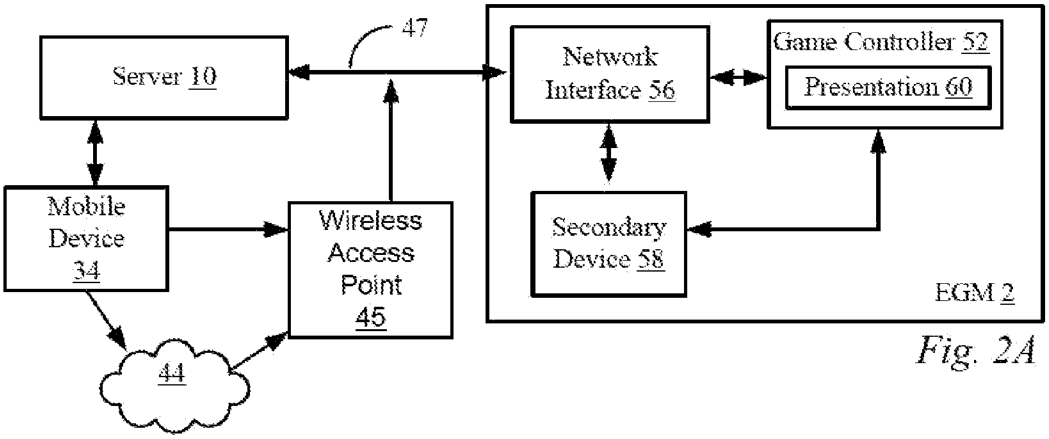
FIGS. 2A, 2B and 2C are block diagrams illustrating different communication couplings between a server, an EGM and a mobile device in accordance with the described embodiments.
Figure 2B:
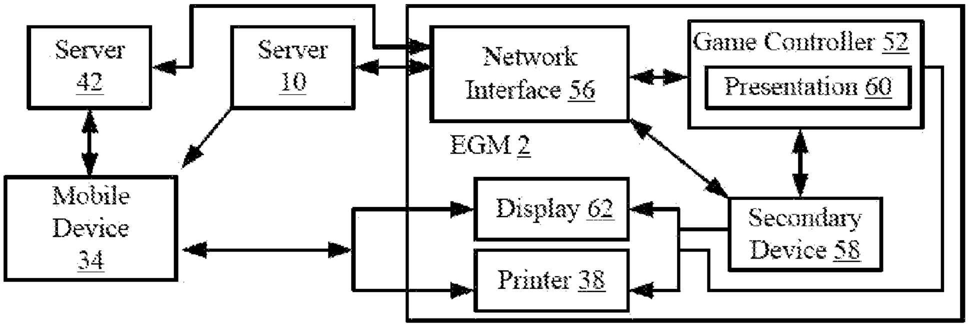
Figure 2C:
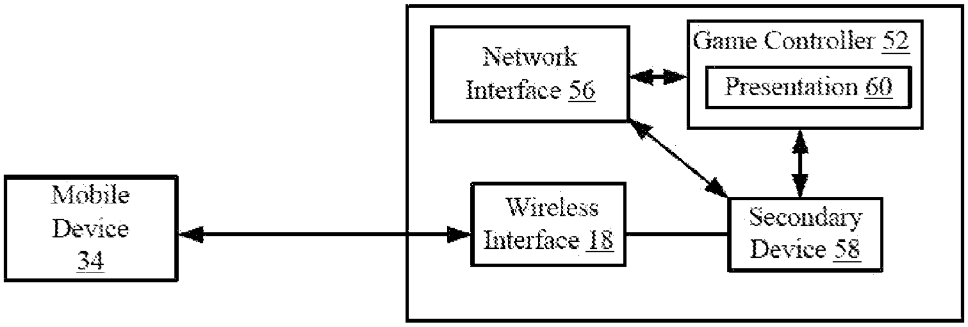

Next details of interactions within an EGM and between an EGM and external devices involving a transfer of information that can be used in a social media application are described with respect to FIGS. 2A, 2B and 2C. In FIG. 2A, an EGM 2 including a network interface 56, a secondary device 58 and a game controller 52 configured to generate a social media presentation 60 is shown. The EGM 2 is coupled to an internal network 47. Via network 47, the EGM 2 can communicate with server 10 and mobile device 34.

In various embodiments, via the network 47, the EGM 2 can send information related to a social media application to server 10 or mobile device 34. In some instances, the server 10 can act as a bridge for communications between the mobile device 34 and the EGM 2. Thus, communications between the EGM 2 and mobile device 34 can be routed through server 10, such as communications involving the exchange of information related to a social media application. In other embodiments, a wireless access point 45 to network 47 can be provided. The wireless access point 45 can be configured to establish communication with remote devices, such as mobile device 34 via a direct wireless connection or via a connection routed through a wide area network 44 to the wireless access point. The mobile device 34 can use a cellular data network, such as a 3G/4G network to access the wide area network 44.

In one embodiment, the game controller 52 can be configured to execute software logic for a social media application. For instance, the software logic 60 can be configured to select content from a game generated on the EGM 2, generate a social media presentation using the content and then upload the generated social media presentation to a remote device via a communication between the game controller 52 and network interface 56.

In another embodiment, all of the portion of the logic for the social media application can reside on and be executed by a secondary controller on the secondary device 58, such as a player tracking unit. For instance, the logic executing on the secondary device 58 can be configured to monitor outcomes being generated on the game controller and select games for use in a social media presentation. When the secondary device selects a game for use in social media presentation, it can send a request to the game controller 52 for social media presentation objects, such as copy of the frame buffer showing the game outcome and the award. In response to receiving the social media objects, the secondary device 58 can generate a social media presentation and/or upload the social media objects to a remote device, such as server 10 or mobile device 34.

The secondary device 58 can be configured to communicate with the mobile device 34 to receive social media information, such as account information, that allows the secondary device 58 to generate a message including the social media presentation and send it to a social media site. As described above, social media account information can be stored in a user's player tracking account and the secondary device 58 can be configured to retrieve this information from the player tracking account and use it to send the message including the social media presentation to the social media site. The game controller 52 can also be configured with these functions, such as the ability to send a generated social media presentation to social media site.

In the next example, an EGM 2 can be configured to send a social media presentation or social media presentation object to a remote device and provide a record locator that allows the social media presentation to be located and retrieved from the remote device. Within EGM 2, a game controller 52 or a secondary device 58, alone or in combination with one another can generate a social media presentation objects and/or a social media presentation including the objects. Then, game controller 52 or the secondary device 58 can send the social media presentation and/or objects to a remote device. In one embodiment, the social media presentation can simply be a screen capture from a game that the player has played on the EGM, such as a screen capture showing a game outcome that is meaningful to the player.

The remote device can be a server, such as 10, located on a casino area network. The server on the casino area network may only be available to other devices, such as mobile device 34, via a local connection made within the gaming enterprise, such as connection made from within a casino or adjacent hotel. From outside of the casino, such as via a wide area network, it may not be possible to access server 10. When a connection is made within a server 10 from a remote device, a social media presentation and/or social media objects stored on the device can be accessed, manipulated and downloaded to the remote device.

In another embodiment, the remote device can be a server 42 situated on a wide area network. Via a home computer or a mobile device, a user may be able to access and download a social media presentation or presentation objects associated with their game play at a gaming establishment. For example, during a trip to the casino, social media presentations and objects from game play sessions on one or more different gaming machines can be uploaded to server 42, then when the user that participates in the game play session returns to home, server 42 can be accessed via a wide area network. After server 42 is accessed, a social media presentation may be uploaded to a social media site.

Server 10 and 42 may receive social media presentations and/or objects from different gaming machines. To allow a user to locate and retrieve the social media presentation and/or object, a record locator can be generated when the presentation and/or objects are created and the record locator can be stored with the presentation and/or objects. Then, the record locator can be input at server 10 or server 42 and the presentation or objects associated with the record locator can be retrieved.

The record locator can be output at EGM 2 in some manner so that a user may later retrieve stored social media information associated with the record locator. In one embodiment, a record locator, such as a URL can be output to a display 62. Then, a user can capture and store the record locator in some manner. For instance, an image capture device on a user's mobile device can be used to capture and store the record locator. In another example, the user can write down the record locator on a sheet of paper. In one embodiment, the URL can be formatted as optical image data, such as a bar-code or a QR code when it is output to the display. The bar-code and/or QR code can be recorded via an image capture device on a mobile device.

In another embodiment, a printer can issue a ticket including a URL. The URL can be encoded in a bar-code or a QR code on the ticket. The URL information on the ticket can be used to locate a particular social media presentation or social media presentation objects on server 10 or 42.

Each time social media related information is generated, the EGM 2 can be configured to generate a separator record locator and upload the social media information associated with the record locator to a remote server. Thus, during a game play session involving a single user, it is possible that the EGM can output multiple record locators. In another embodiment, the EGM 2 can be configured to determine when a game play session begins and a game play session ends where a single record locator can be used for the game play session. For example, each time credits are deposited on the EGM 2 a record locator can be generated. Until a cashout command or a zero credit condition is reached, any social media related information that is generated can be associated with the record locator for the game play session and uploaded to a remote device. After the credits reach zero or a cashout command is received, the EGM 2 can output a record locator for any uploaded social media information. If no social media information has been uploaded, then the EGM 2 may not output a record locator.

In yet another embodiment, the EGM 2 can be configured to allow a record locator to be input. For instance, at a first EGM, a user can output a printed ticket including a record locator associated with social media information on a remote server. At a second EGM, the printed ticket can be inserted and the record locator can be read from the ticket, then additional social media information that is generated on the second EGM can also be uploaded to a remote server and associated with the received record locator.

In some instances, the social media applications can be provided only to players registered in a loyalty program. To have social media information captured and uploaded to a remote server, player tracking account information may have to be entered at the EGM. After receiving the player tracking account information, when any social media information is uploaded to a remote server it can be associated with the player tracking account information. The remote server receiving the social media information can be configured to receive a player tracking account number. The remote server can be configured to retrieve any social media information uploaded to the device associated with the player tracking account information. In this embodiment, the social media information may have been generated on one or more different EGMs.

As is described with respect to the next figure, in one embodiment, social media information may only be output from an EGM via a local communication between the EGM and a mobile device. In FIG. 2C, an EGM 2 includes a wireless interface 18. Via the wireless interface, communications, such as a secure device pairing, can be established between the EGM 2 and a mobile device 34. In alternate embodiments, the EGM 2 can include a wired communication connection that allows information to be transferred between the EGM 2 and the wireless device.

During game play on the EGM 2, a particular game can be played with an outcome that is of interest to a user for the purposes of a social media application. Via an input mechanism on the EGM 2 or via an input mechanism on a user-controlled mobile device, a user can generate an input signal that indicates their desire to use some aspect of the particular game of interest in a social media application. The input signal generated on the mobile device can be sent to the EGM 2 via wireless interface 18. In response to receiving the input signal, the game controller 52 or the secondary device 58, alone or in combination with one another, can generate social media information related to the particular game of interest. For instance, in one embodiment, a social media presentation or social media presentation objects associated with the particular game can be generated.

When the social media information is ready, a message can be output on the EGM 2, such as to a display, indicating that the social media information is available. When the EGM 2 is currently paired to a user's mobile device, the EGM 2 can automatically, or in response to an input signal indicating a user still wants the social media information, transfer the generated social media information to the user's mobile device, such as 34. When the mobile device 34 is not currently communicatively coupled to the EGM 2, then the EGM 2 can output a message requesting the user to establish a communication connection between the EGM 2 and a user-controlled device that is to receive the social media information. After the communication connection is established, the EGM 2 can transfer the social media information to the user-controlled device, such as via wireless interface 18.

In one embodiment, when a communication session is not established with a user controlled device and another game is initialized on the EGM 2, then the EGM 2 can delete the generated social media information. For instance, if the user doesn't possess a mobile device then a communication session will not be established and the social media information may not be retrieved. In another embodiment, the EGM 2 can output a record locator, such as a record locator output on a printed ticket. The record locator can be output automatically by the EGM 2 if a communication session is not established with a user controlled device within a time period or in response to an input signal generated on the EGM interface indicating a request to output the record locator.

In one embodiment, the record locator that is output from the EGM 2 may only be valid for retrieving data stored on a particular EGM 2 or a bank of EGMs. Later, such as after retrieving their mobile device, the user can return to the EGM the bank of EGMs where the record locator was generated and input the record locator. For instance, a printed ticket including the record locator can be inserted into the EGM. In response to reading the information on the printed ticket, the EGM 2 can retrieve the social media information associated with the record locator and again attempt to establish a communication session with a user controlled mobile device that is to receive the retrieved social media information. When a communication session is established and the social media information is successfully transferred, the EGM 2 can be configured to delete the stored social media information.

The social media information associated with the record may only be stored for a limited period, such as an hour or 24 hours. When the record locator is generated and output, the time period that the social media information associated with the record locator is to be stored can be indicated. For instance, a printed ticket might say return before "Time A" to retrieve your social media information. When the social media information is not retrieved within the allotted time period, the EGM 2 can delete the record locator and the associated social media information.

Social Media Presentation Generation and Examples

Figure 3:
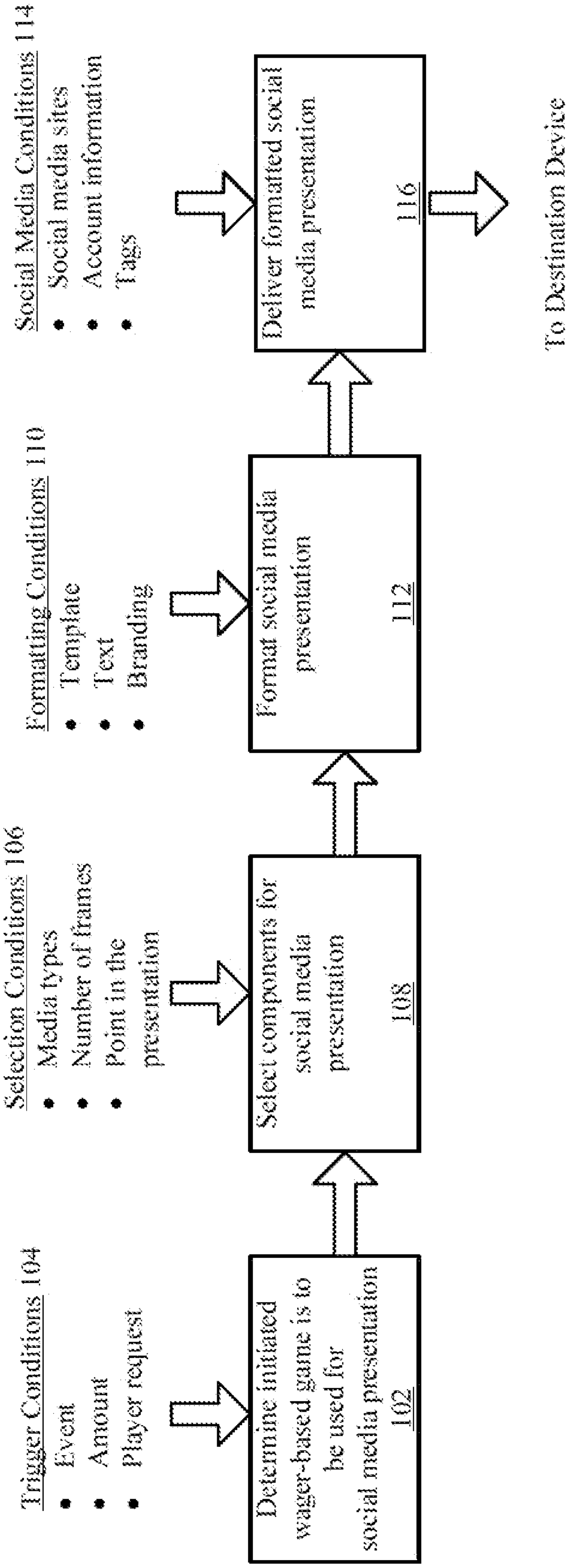
FIG. 3 is a block diagram that illustrates processes for creating and uploading a social media presentation including components related to the play of wager-based game in accordance with the described embodiments.

In this section, the generation of social media information, such as a social media presentation, that can be used in a social media application is described with respect to FIGS. 3, 4A, 4B, 4C, 5, 6A and 6B. FIG. 3 is a block diagram that illustrates processes for creating and uploading social media information, such as a social media presentation and/or social media components related to the play of wager-based game. Typically, after credits are deposited, game play may begin on an EGM consisting of the play of one or more wager-based games. In 102, a determination can be made that social media information is to be generated from a wager-based game that has been initiated on the gaming machine. The determination can be made by a game controller or a secondary device on the EGM alone or in combination with one another. In addition, the determination can be made by a device located external to the EGM, such as a server or a mobile device in communication with the EGM.

The determination in 102 can be based upon trigger conditions 104. In one embodiment, a trigger condition can be an external event. For instance, on New Year's Eve at midnight, a signal can be sent out to a plurality of EGMs to generate social media information based on current conditions on each EGMs. In one embodiment, the signal can be generated on a server in communication with the one or more EGMs. The social media information can be generated from games currently in progress when the signal was received or games initiated within some time period after the signal.

Other examples of triggering the creation of social media information based upon an external event include but are not limited to a big play during a sporting event or other external news event. Some triggering events, such as New Year's Eve can be scheduled ahead of time. Other triggering events, such as an external news event deemed of importance, can be generated in real-time when a gaming operator determines an event is important. In yet another example, a triggering event can be a big event at the casino, such as the win of a large jackpot in a wide area progressive game. This event may trigger the generation of social media information on enabled EGMs within a casino.

The triggering events described above may be deemed of interest to a large percentage of individuals participating in a wager-based game play or to a casino operator. Other triggering events may be deemed of interest to smaller groups of individuals. As an example, a group of players can go to a casino, a particular time when each of the players is participating in a gaming activity, such as a play of a video or mechanical slot machine, an event can be triggered that causes each of the EGMs that the group is utilizing to generate social media information, such as a social media presentation. In one embodiment, the gaming system can be configured to determine whether each of the player's in the group are participating in the gaming activity and based upon this determination trigger the event. In another example, an event for the group can be triggered by the actions of one of the players in the group. For instance, when one of the players in a group wins a big jackpot, social media information can be generated for each of the players in the group currently participating in a gaming activity. In one embodiment, social media information can be gathered and consolidate for the group. For instance, social media information of what was going on for each member of the group when one of the group members won a large jackpot can be consolidate an integrated into a single social media presentation (see FIGS. 6A and 6B for more details).

Another trigger condition 104 can be a jackpot amount threshold. When the jackpot amount threshold is exceeded on the EGM, social media information can be generated and transmitted to a remote device, such as a remote server or a user's mobile device. The threshold amount can be exceeded based upon an award in a primary game and/or a bonus game. Rather than a threshold amount, a trigger can be based upon the probability of an outcome occurring. For instance, all outcomes with a less than 1% chance of occurring can trigger a generation and capture of social media information. This threshold is useful because it compensates for the denomination of the EGM. On lower denomination machines the amount won that triggers the generation of social media information may be less than on a higher denomination machine but may still be significant to a player playing the lower denomination machine.

In particular embodiments, a player may be able to specify threshold conditions for generating social media information. For instance, in one embodiment, this information can be stored in a user's player tracking account and downloaded to an EGM whenever the player provides their player tracking information. In another example, the EGM can be configured to receive these thresholds from a player's mobile device.

One event can be a request initiated by a user. For instance, in response to a mechanical button being actuated or a touch event detected on a touch screen, an EGM can be configured to generate social media information associated with a particular game. For instance, after a win above a certain threshold amount, a message can be generated on an EGM requesting whether the user would like to upload social media information about the win to a social media site. If the EGM detects an affirmative response, then the EGM can generate social media information about the win and send it to a remote device.

In another embodiment, independent of the win amount, an input mechanism on the EGM can be available that when activated will generate social media information associated with a particular game. This type of trigger can be used in a treasure hunt game where players might compete to receive certain symbol combinations in different games. Each time a symbol combination of interest is recognized and the input mechanism is activated, social media information describing and/or showing the symbol combination can be generated on the EGM.

In 108, social media information can be generated that can be used in a social media application. In one embodiment, after a particular wager-base game has been selected, social media components to be used in a social media presentation can be selected and generated. The social media components that are selected can depend on a number of selection conditions 106. One selection condition can be media types. For example, one or more still images, video clips, audio clips or combinations thereof can be selected. Another selection condition 106 can be at what point in the game outcome presentation to generate the selected media type.

In one embodiment, the EGM 2 can include a screen capture button that when actuated captures the current output to the display screen. Thus, the selected media type is a still image and the selected time is when the screen capture button is actuated In general, the media types can be configuration parameters recognized by the EGM 2. For instance, the EGM can be configured to generate a single still image showing the award amount for the game. In another example, the EGM can be configured to generate two still images. A first showing the state of the EGM before the start of the game and the second showing the state of the EGM after a big win. In yet another example, the EGM can be configured to generate a video clip which may or may not include associated sounds showing the video of the EGM state of the EGM just prior to the initiate of the game through video images showing the credit rollup on the EGM (The rollup shows credits on the EGM increasing in response to an award). When a bonus game win is included, the video images might show the initiation of the base game through its outcome followed by the video images of bonus game presentation and then returning to a credit rollup.

To accommodate the selection conditions 106, the EGM may include separate logic for generating the selected media types from the presentation graphics associated with the game. For instance, the separate logic might reuse the presentation graphics to generate an initial still image of the game outcome presentation at the start of the game, a still image while the game outcome presentation is in progress and a still image showing the award for the game outcome. In another embodiment, the EGM may be configured to generate screen shots by copying the frame buffer at certain times. In this embodiment, the graphics used for the game outcome presentation are only generated once. Since the game outcome presentations can vary in length depending on the type of game (different themed slot games can have different presentation lengths and presentation outcome sequences, the time in a game outcome presentation where the presentation graphics are reused or when a screen capture is generated in the presentation can vary depending on the specific game being executed on the EGM.

After the social media information, such as the social media components are generated, a social media presentation can be generated that utilizes the components. The EGM can be configurable to accept different formatting conditions 110 that affect a final format of the social media presentation. As an example, the EGM can include templates that arrange social media components in a certain configurations. In one embodiment, EGM can be configured to display and receive a selection of one of a plurality of templates to utilize.

In one embodiment, the templates might be a single page. The templates can include an arrangement of the generated social media components, such as still images and additional information. For instance, the template can include a message describing the event captured in the still images, such as a time, place, jackpot amount, game name and a player's name. In one embodiment, the EGM can be configured to accept text information that can be incorporated in the social media presentation. The template can include a link to a video outcome presentation for the game shown in the template, such as a link at an operator web-site at which the video outcome presentation can be viewed. The template can include branding, such as a casino name and advertising. For instance, a casino logo can be provided on the message and a message, such as be our friend at a URL.

In one embodiment, the template can include secondary images and decorations that are part of a theme. For instance, the theme can be related to a theme of the game that is featured in the template. In another example, the theme might be an event theme, such as a Christmas, Thanksgiving, Superbowl, St. Patrick's Day, etc, when the game play occurred within a time period associated with the event. Further details of formatted social media presentations are described with respect to FIGS. 4A, 4B and 4C.

Selections of the formatting conditions can be made at an EGM or on a remote device to which the social media presentation has been uploaded. In one embodiment, the formatting conditions can be preselected and stored to a player's account, such as a player tracking account or stored on their mobile device. When the social media presentation is created at device, such as an EGM or a server, the preselected formatting conditions can be retrieved from another device, such as the player's mobile device, and used in the generation of the social media presentation.

In 116, social media information, such as a formatted social media presentation, can be delivered to another location for storage, such as a device associated with a social media site or a user's mobile device. When sent directly to a social media site, such as from an EGM to the site or from a server to the site, an input of media conditions 114 can affect where the social media information is sent and who can view the social media information. For example, an EGM can be configured to receive information regarding one or more social media sites to send this information and account information associated with the sites and how it is to be treated at a social media site, such as posted to a user's wall or sent to a photo album at Facebook™. The social media information might allow a user to change a status on the site, such "Having a great time in Vegas, just won big at slots."

The social media sites may allow a user to notify other users that information of interest to them is available. On Facebook™, this feature is called "tagging." A tag links a person, page, or place to something that is posted, like a status update or a photo. For example, a photo can be tagged to say who's in the photo or post a status update and say who you're with. Tagging people, pages and places posts lets others know more about who you're with, what's on your mind and where you are. When you someone is tagged, they'll be notified. Also, if you or a friend tags someone in your post and it's sent to Friends or more, the post is visible to the audience you selected plus friends of the tagged person. Tags or equivalent information are one type of social media conditions that can be accepted at an EGM or other gaming device.

Certain social media sites may require information in certain formats and the source device can be configured to send the information according to the format of the social media site that receives the information. For instance, for Twitter™, the social media presentation can be sent as a "twit pic" with a 160 character or less message. In one embodiment, besides a social media site, the user may be able to specify an e-mail address or some other account to send the social media information. After the social media conditions are specified, the social media information can be delivered to the specified social media sites, user controlled devices, such as their mobile phone, and/or user accounts such as an e-mail account.

Figure 4A:
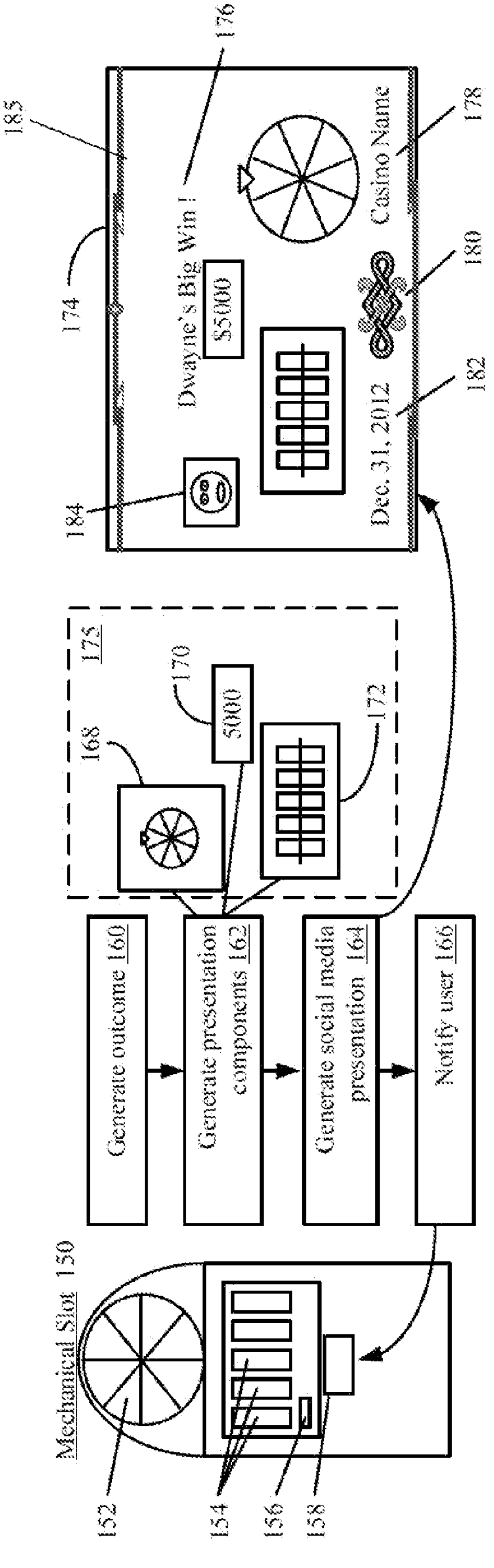
FIGS. 4A, 4B and 4C are block diagrams illustrating method and apparatus for generating a social media presentation associated with the play of a mechanical, video or multi-layer display gaming machines in accordance with the described embodiments.
Figure 4B:
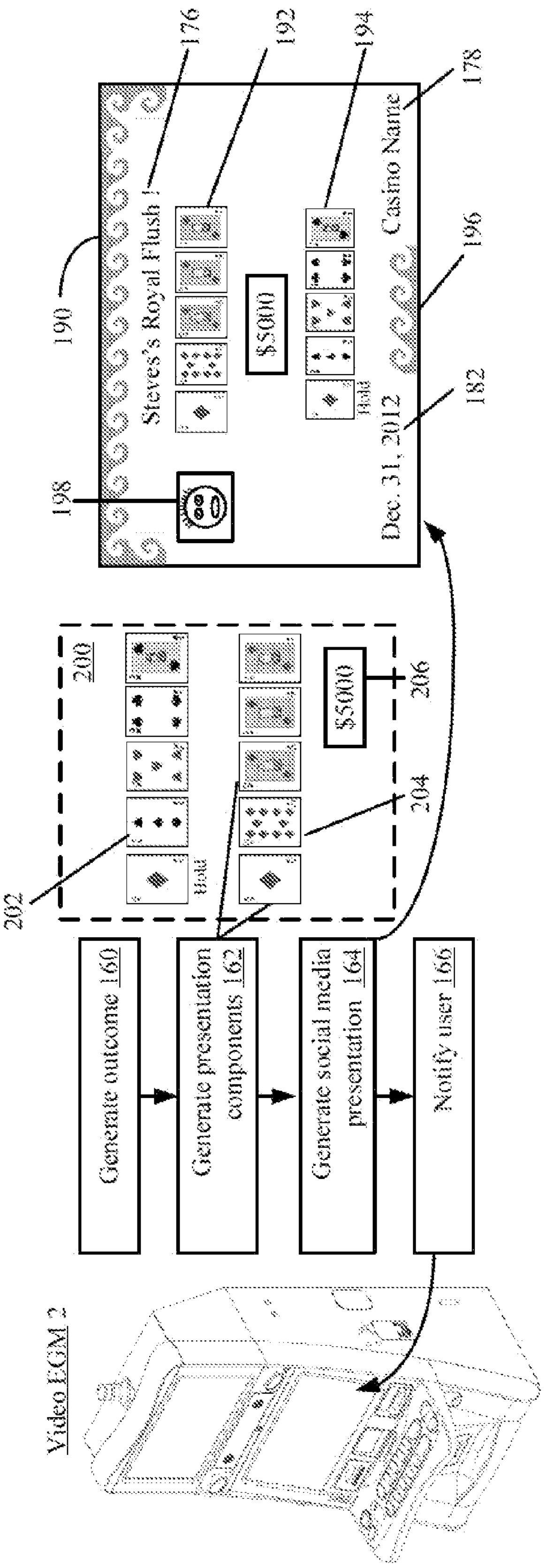
Figure 4C:
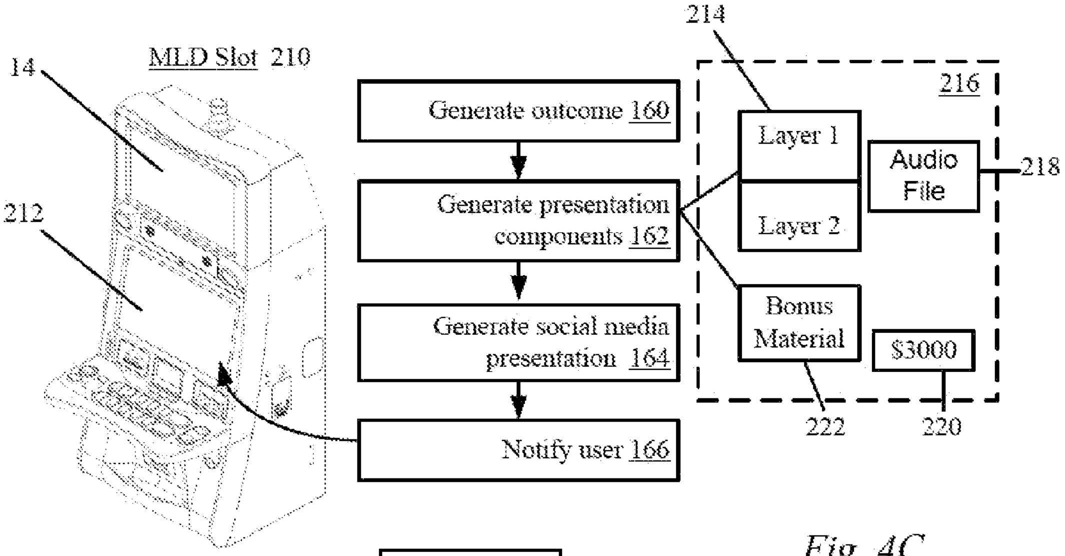

FIGS. 4A, 4B and 4C are block diagrams illustrating method and apparatus for generating a social media presentation associated with the play of a mechanical, video or multi-layer display gaming machines. For each of the devices, a wager-based game can be initiated (160), social media presentation components can be generated (162), a social media presentation can be generated (164) and a user can be notified about the generation of the social media components and/or social media presentation (166). As is described with respect to FIGS. 4A, 4B and 4C, the implementation of these steps can vary depending on the type of device.

In FIG. 4A, a mechanical slot machine 150 is shown. The mechanical slot machine can include one or more bonus devices, such as wheel 152. The bonus device can be used to reveal an outcome to a bonus game. For example, in a Wheel of Fortune™ game by IGT (Reno, Nev.), the bonus wheel can spin and stop at a particular location to show the outcome to a bonus game, i.e., an amount of credits won. The bonus device can include mechanical and/or video components. For instance, the wheel 152 can be a mechanical wheel that spins are a video display on which a mechanical wheel is rendered spinning.

On a mechanical slot machine, the game outcome is typically displayed as symbols on rotating reels 154. Different number of reels can be used on different types of mechanical slot reels. The reels include a number of symbols where different combinations of symbols are used to reveal the outcome to a wager-based game. The device 150 can include displays, such as a credit display 156 that reveals a total amount of credits on the EGM, an amount wagered and an amount won for a particular game. In some instances, the mechanical slot machine 150 can include a secondary display, such as 158, that can be used to display auxiliary information. In one embodiment, the secondary display can be associated with a secondary device on the slot machine 150, such as a player tracking unit.

For a mechanical slot machine 150 social media presentation components 154 can be generated in a number of different ways. If a remote camera is available that has a view of the reels of the machine 150 and can generate an image with enough resolution, then one or more still images or video clips can be taken of the reels and used to generate social media components. In another embodiment, a graphical representation of the slot reels and bonus devices can be generated. Many slot reel games have video equivalents. The mechanical slot 150 can be configured to utilize software that generates graphical presentation components that correspond to the outcome shown on the mechanical reel, such as software generated for a video equivalent. For example, a graphical representation of the wheel 168 in a position corresponding to a bonus game outcome, a graphical representation of the credit meter 170 and a graphical representation of the game outcome 172 displayed on the mechanical reels as if viewed through the front of the EGM 150 can be generated. The graphical equivalents to the information displayed on the mechanical reels and credit meters can be used to generate social media presentation components.

In yet another embodiment, each reel typically includes around 30-40 symbols. At any one time, some fraction of the symbols on each reel, such as 3 symbols or 5 symbols is visible through a viewing window. In one embodiment, images, such as photographic images, can be taken for each reel in each of its possible positions as viewed through the front of the mechanical slot. The images can be formatted (e.g., cropped) to the size of the viewing window associated with each reel. When each of the reels includes an identical reel strip, i.e., the same symbols, in the same order than only a single image file may be needed. If different reel strips are used, then an image file showing each of the visible portions of the reel in each of its possible positions may be needed.

To recreate the outcome of a mechanical game, after a game outcome is determined, an image for each reel can be selected that includes the symbols that are visible through the viewing window for each reel for the determined game outcome. In one embodiment, the selected images of the reels at a particular position corresponding to the game outcome can be integrated with an image showing some portion of the front of the EGM. For instance, at each location on the image of the front of the EGM where a viewing window for a reel is located an image of a reel in its position corresponding to the game outcome can be placed. The integrated image can be used to generate a social media component, such a social media component 172.

To generate a social media component showing one or more reels spinning, i.e., while the game outcome presentation is in progress an image of a reel spinning that can appear to be blurry can be integrated with an image showing the front of the EGM 150. Thus, images of the some of the reels in their final stopped position can be used and images of other reels in a spinning configuration can be used and integrated into with the image showing the front of the EGM. The integrated image can be used to illustrate an intermediate state of the EGM where the reels are stopping at different times.

Besides images of the slot reel, images of the meters showing the amount won, amount bet and total credits on the EGM at different values can be stored. In one embodiment, the images may be a small rectangle where the credit meter fills the rectangle. For a particular game outcome, the images corresponding to the amount bet, amount won and total amount on the EGM can be selected for use a social media presentation components. For example, social media component 170 can be an image of a meter showing an amount won for a particular game.

In the case of a bonus device that is used to reveal a game outcome, images of the bonus device in different states according to the game outcome can be generated and store on the EGM. For instance, a wheel 152 in each of its possible positions for showing a bonus game outcome can be stored. For a particular bonus game outcome, a corresponding image showing the bonus game outcome can be selected and used as social media component. For instance, social media component 168 can be a selected image showing the wheel 152 in a final position corresponding to a bonus game outcome shown on machine 150.

Some mechanical slot machines include video displays and mechanical reels. The video display can be used to show a bonus game outcome. In this example, still images or video clips of a bonus game outcome presentation which can include sound can be selected as social media presentation components. The selected social media components showing the bonus game outcome can be used in combination with the photographic images showing the reels in different positions as viewed through the front of the EGM.

As described above, the social media components can be assembled to generate a social media presentation component. In one embodiment, the presentation can be a still image that includes a number of social media components 175. For instance, presentation 174 is a rendered image that includes an arrangement of the presentation components 168, 170 and 172. The presentation includes a date 182 when the game occurred and a casino name 178 where the game was played. In one embodiment, the casino name can be a casino logo associated with the casino. The time (not shown), a location (not shown) of the casino, such as Las Vegas, and the name of the game played, can also be included in 174. The presentation secondary images, such as border 184 and graphic 180. As described above, the secondary images can be selected to match a theme, such as the theme of the game, a theme of the casino, a theme associated with a time of year, a theme selected by the player or casino or combinations thereof. If an image 184 of the player is available, it can be integrated into to the presentation.

In one embodiment, the EGM can be configured to allow a user to select from among different text messages to include in the presentation. For instance, the message 176, "player's first name" followed by "Big Win!" may have been selected by the player. In one embodiment, the EGM can be configured with an interface that allows a player to enter text, such as their name and/or a message to be used with the social media presentation. In another embodiment, the presentation can be transferred to a user's mobile device and then via an application executed on the user mobile device, a message can be added to the presentation 174. Then, the modified presentation can be uploaded to a social media site from the user's mobile device.

In some embodiment, objects can be linked to items in the presentation 174 so that when the presentation is viewed on a social media site a selection of the item can provide additional functions. For instance, selecting the casino's name 178 might result in a window showing the casino's web site being generated. In another example, selecting the casino's name 178 may establish a link between the user and the casino on a social media site. For example, selecting the casino's name on Facebook™ can generate an interface that allows the user to become a friend of the casino or an associated gaming corporation on Facebook™. In yet another example, social media component 172 can be linked to a video presentation of the game outcome. When the social media component 172 is selected, a window showing a video presentation of the game outcome can be generated.

Next with respect to FIG. 4B an example of a video EGM 2 configured to generate a card game is shown. In the example in FIG. 4B, the card game is a single hand 5 card poker game. However, other types of poker games (e.g., multi-hand poker, more or less than 3 cards) or other types of card games (e.g., black jack) can also be played on video EGM and the example in FIG. 4B is described for the purposes of illustration only.

Three presentation components 200 have been generated. The first social media presentation component 202 shows a 5 five card poker hand that was dealt including the cards held. The second social media presentation component 204 shows the hand after new cards have been dealt. In this example, a royal flush has been dealt. The third presentation component 206 shows an amount won which is $5000 dollars. The three presentation components are integrated into a social media presentation 190. Similar to presentation 174 in FIG. 4A, a player's image 198 can be integrated into the presentation when available. The presentation includes a message 176 indicating the player name Steve has won a royal flush. The presentation 190 includes a different theme than 174. In this example, a water theme 196 with secondary images of waves is utilized.

Next with respect to 4C, a MLD (multi-layer display) slot 210 is described. In a MLD slot, such as 210, the game outcome presentation can be output to a display with multiple layers. For example, the multiple layers can be two video displays aligned with one another such that images displayed on a first video display are viewable through a second display. In another example, the multiple layers can be a video display aligned with mechanical reels such that the mechanical reels are visible through a first display layer. In FIG. 4C, MLD slot 210 includes a display 210 with two video display layers.

In FIG. 4C, three social media presentation components 216 have been generated. The social media components include social media components from each layer of the two layer video display integrated into a common single image 214, an audio file 218, bonus material 222 that was output on display 14 and a credit meter 220 showing the amount won for the game. For a multilayer display, a social media presentation object can be generated for each layer or only a portion of the layers. For instance, for a two layer video display, a social media presentation component can be generated for the first display and the second display or only the second display. In addition, a social media presentation component can be generated that integrates the multiple layers into a single image. For instance, in a two layer video display, the images displayed on the front display and the back display can be integrated into a composite image that can be used as a social media presentation object. In particular embodiments, social media presentation objects can be generated from each presentation layer alone or can be combined with another layer to generate a social media presentation object.

As described above with respect to FIG. 1, social media presentation objects generated from multiple games played by the same or different players can be integrated into a single social media presentation. A gaming system for gathering social media presentation objects from multiple games is described with respect to FIG. 5. Then, with respect to FIGS. 6A and 6B, social media presentations including social media presentation objects generated from different games are discussed.

FIG. 5 is a block diagram illustrating a gaming system for generating a social media presentation and uploading social media presentation to a remote server. In FIG. 5, a server 320 is coupled to a number of gaming devices, 302, 304, 306 and 314. Each of the gaming devices, such as 314, can be a social media presentation component source. A social media presentation component source can be a gaming device that generates and displays a game outcome. Typically, the social media presentation component can be associated a presentation for a game output one the source gaming device. Although, as described above, the server 320 can be configured to receive information from an EGM that allows a state of a presentation on the EGM to reconstructed and based upon the reconstruction of the EGM presentation to generation social media components.

As an example, the server 320 can include portions of the gaming software used to generate a game outcome presentation on an EGM. The portions of gaming software can be used to reconstruct one or more presentation states on the EGM and from the reconstructed presentation states generate social media presentation components associated with the states. In one embodiment, the server 320 can receive social media presentation components from some of the EGMs and from other EGMs can receive information, such as information about a game outcome generated on the EGM, which allows the server to generate social media presentation components from the received information.

The EGMs, such as 302, 304, 306 and 314 can be configurable to select a game to be used for a social media presentation and generate social media presentation objects for the game. In some embodiment, the EGMs can be configured to receive information from server 320 that affects whether a game is selected for a social media presentation, such as a threshold jackpot amount. After an EGM selects a game, information about the game and the possibly the player playing the game can be uploaded to server 320 and stored in database 308. The server can include a social media presentation creator 310 that can select based upon inputs 312 a plurality of different games to use in a social media presentation. For instance, games related by not limited to a time period, as being played by a single player, as being played by a related group of players or that were played near a time when an event occurred can be selected.

The server 320 can be configured to generate a social media presentation from the selected games that includes social media information related to each game played, such as social media presentation objects associated with each game. The server 320 can be configured to transfer a copy of the social media presentation to a device controlled by a user. For example, a user can request a copy of a social media presentation including results from a number of different games played by the user over some period. The server 320 can also be configured to receive information from a user that allows the social media presentation to be uploaded to an account associated with a social media site 46, such as user account 50. In addition, the server 320 can be configured to upload a social media presentation, such as a social media presentation showing the winners of large jackpots over a particular month to an operator website, such as 42. In addition, the social media presentation can be posted to a social media account 48 associated with the operator at social media site 46.

Figure 6A:
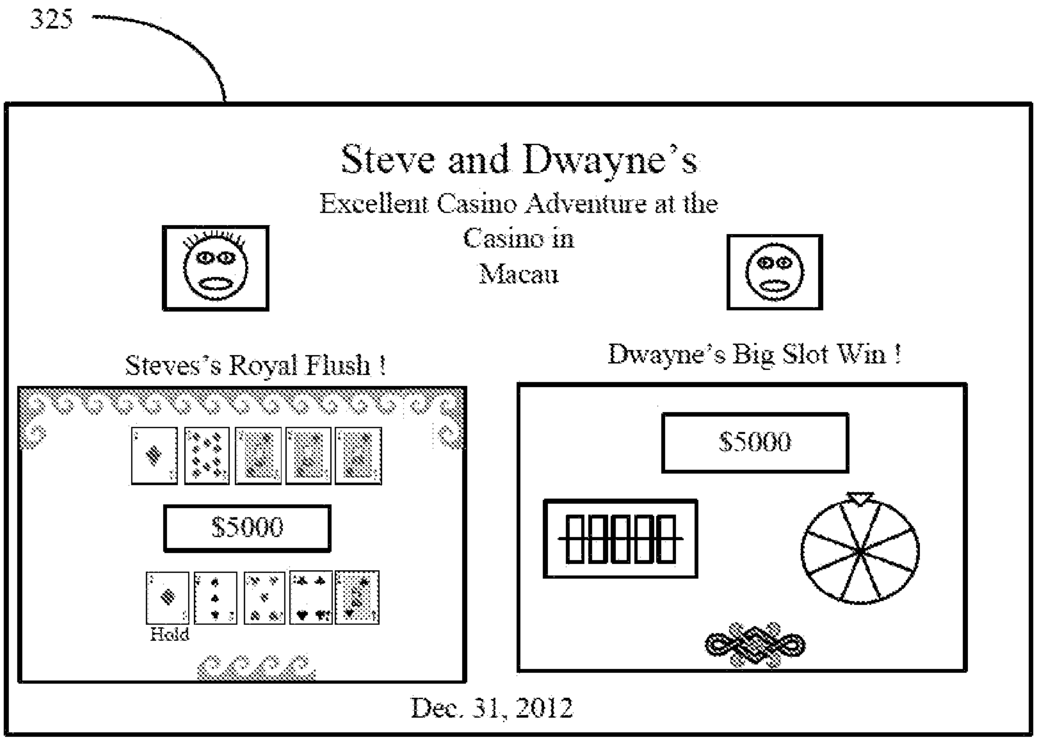
FIGS. 6A and 6B are block diagrams illustrating social media presentations generated in a gaming system including social media components associated with a plurality of individuals in accordance with the described embodiments.
Figure 6B:
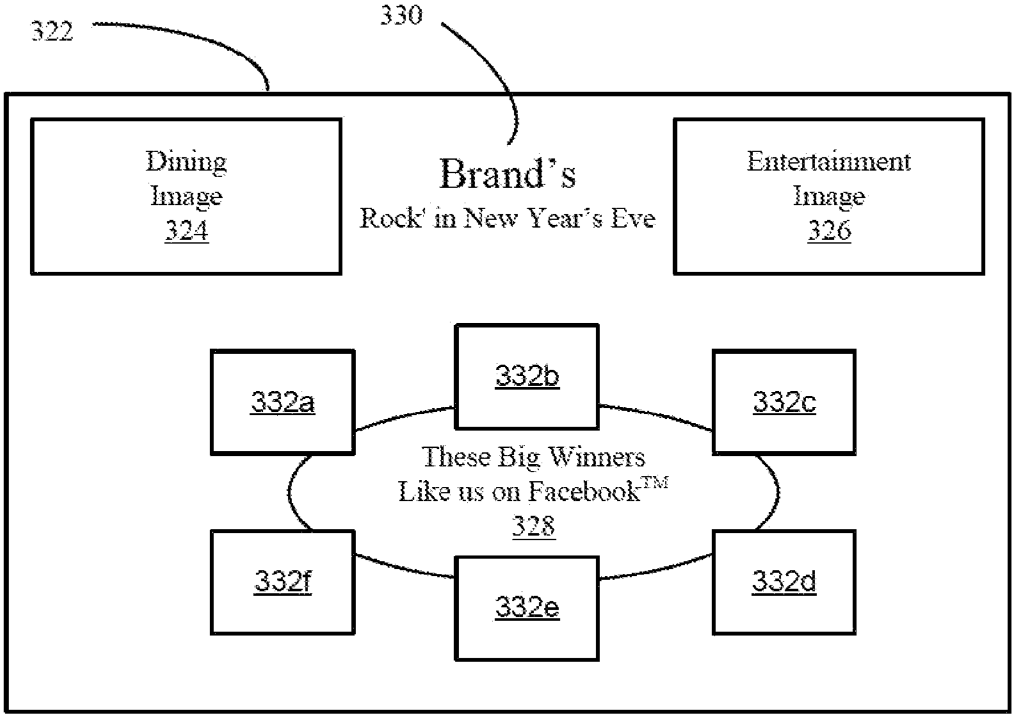
Figure 7:
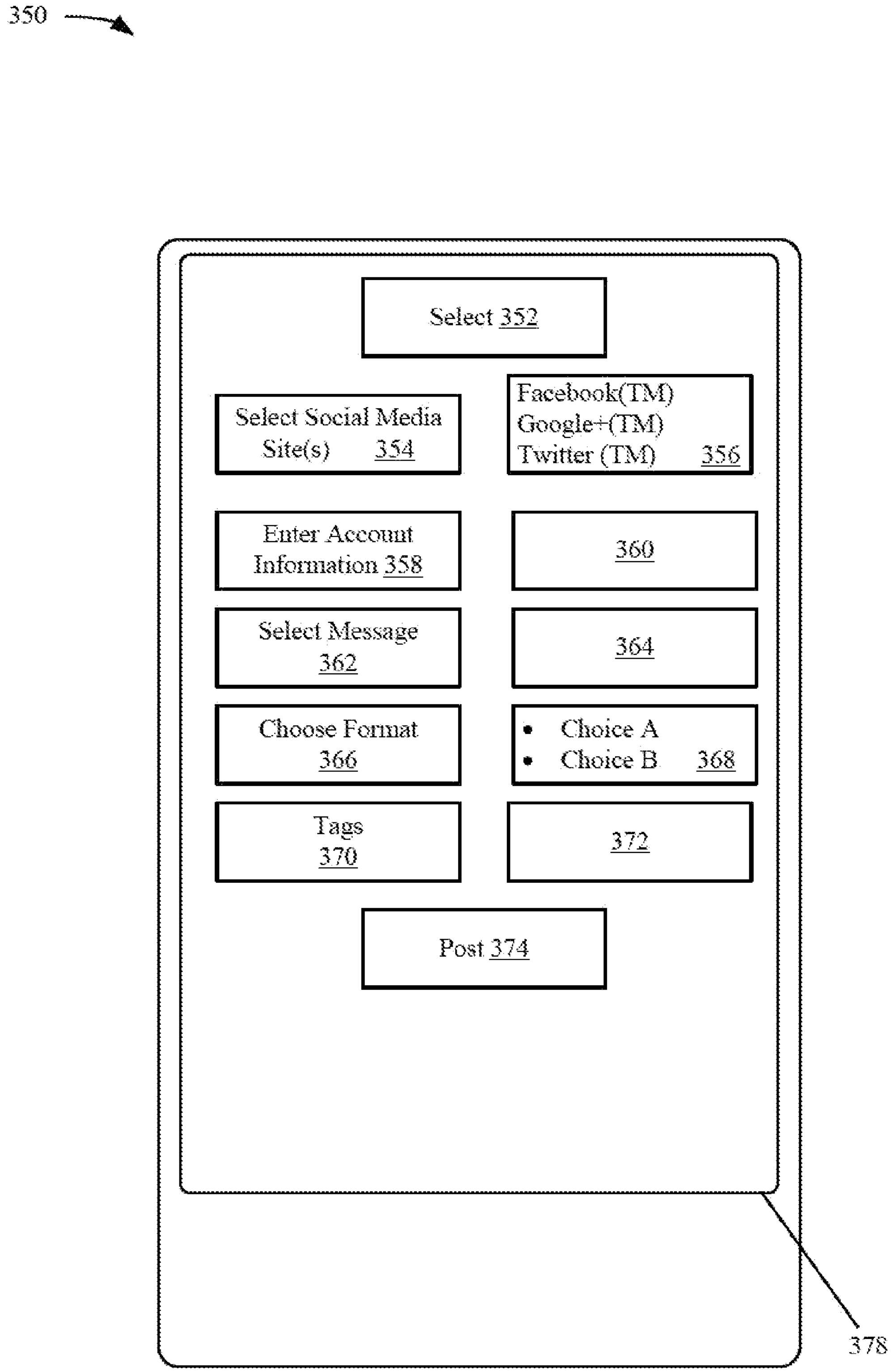
FIG. 7 is a block diagram of a mobile device executing a social media application compatible with a gaming device in accordance with the described embodiments.

Next, a few examples of social media presentations generated from multiple games are described with respect to FIGS. 6A and 6B. In FIG. 6A, social media components generated from two different games played by two different individuals are combined into a single social media presentation. For instance, the two social media presentations (174 in FIGS. 4A and 190 in FIG. 4B) may have been played by two players, such as two friends on a vacation to China. Social media presentation objects from the two games can be combined into a single social media presentation 325 that shows information about each of the players and games that each of the player's played. Upon receiving social media account information from one or both of the users, the social media presentation can be uploaded to the social media site that provides the account. Alternately, the social media presentation can be uploaded to a user controlled device, such as mobile device or home computer, upon a request by a user.

In 6B, a social media presentation 322 is generated from social media objects associated with a number of different games. The presentation 322 is designed to advertise for a particular casino operator. The social media presentation includes images associated with the casino where the games were played, such as dining related image 324 and entertainment image 326. The games selected for the social media presentation are selected based upon an event associated with a particular time period. In this example, the event is New Year's Eve and each of the games selected were played within some time period near New Years Eve. Each of the games may have been selected to satisfy a set of conditions, such as occurring within a specified time period and a win amount over some threshold.

Social media presentation components from each of six different games, 332*a*, 332*b*, 332*c*, 332*d*, 332*e* and 332*f*, satisfying the selection conditions, are arranged in the presentation 322. The social media presentation components, for each of the six different games, are arranged around an oval. This arrangement is provided for the purposes of illustration only as different number of games and different arrangements can be utilized. In one embodiment, a screen capture or a representative image of the game outcome for each game can be displayed in the presentation 322. A message 328 with a social media component is shown in the center of the oval. In this example, the message states, "These Big Winners like us on Facebook™."

The message 328 can be used to indicate that each of the winners has an established social media connection with the operator. In another embodiment, a message can be displayed that encourages a user viewing the presentation 322 to establish social media connection with a gaming operator. For instance, the message might read "if you are over 18 become our friend and be registered in a drawing for a prize." The presentation 322 can include an object that when selected allows a social media connection to be established between a user with a social media account and a social media account associated with a gaming operator.

Social Media Application on a Mobile Device

As described herein, a user controlled mobile device can be configured to communicate with a wager-based EGM. For instance, the EGM can be configured to allow a secure pairing to be established between the EGM and the mobile device. A mobile device can be configured to execute a social media application. In particular embodiments, the social media application can be used to affect social media information generated on the EGM, such as a social media presentation. An example of a mobile device 350 executing a social media application is shown in FIG. 7. The mobile device 350 includes a touch screen display 378. A screen shot of display 378 is utilized to illustrate some of the functions that can be associated with an executed social media application and is not meant to be limiting.

In one embodiment, a button 352 can be generated which is used to select a game outcome for use in social media presentation. For instance, when button 352 is selected a signal can be sent to an EGM that causes the EGM to generate social media presentation objects and optionally a social media presentation from a game played on the EGM. For example, the EGM can capture a copy of the frame buffer that shows the game outcome. In one embodiment, the EGM can do a screen capture of what is currently being displayed on the EGM when the signal is received. In another embodiment, the EGM can be configured to delay the screen capture until an appropriate moment, such as when the outcome to the game is being shown. In 354, the application can display a message to select one or more social media sites. In 356, one or more selectable social media sites can be displayed. For each of the selected social media sites, the application can prompt the user to enter account information. The application can be configured to receive information received in box 360.

In one embodiment, if a game has been selected for use in a social media presentation, a message 362 can be displayed that allows a user to select a message to include in the social media presentation. In one embodiment, box 364 can include a number of user selectable messages. In another embodiment, the box 364 can be configured to allow a user to enter a message up to a certain length that can be included in or with the social media presentation. For instance, an up to 160 character tweet can be entered if the selected social media account is Twitter™. A message 366 can be output that indicates that a user can select one or more parameters that affect a format of the social media presentation. The selectable formatting conditions can be listed in box 368. In one embodiment, as described above, a user can select from among different templates that are used to format a social media presentation.

The application can be configured to allow a user to enter a number of parameters that affect how the social media information, such as the social media presentation, is processed at a social media sites. For instance, a message 370 can be generated prompts the user to enter tags for the message. The tags can be entered in box 372. On Facebook™ tags can affect which users are notified when social media information is posted. A button 374 can be provided that when selected posts social media information to a selected media site.

In various embodiments, the application shown executing on the mobile device can provide an interface for an application executing on a gaming device. For example, when a format is selected for a social media presentation in 368, the format choice can be sent to an EGM which formats the social media presentation according to the choice. In another example, the social media objects can have been uploaded to the mobile device 350 and the formatting selections can be implemented on the mobile device 350. In yet another embodiment, this type of application can be displayed directly on a gaming device, such as on a touch screen display controlled by a game controller or a secondary device. Via the interface, a social media presentation can be manipulated and posted to a social media site. In one embodiment, when an interface related to a social media application is generated on the gaming device, an interaction between the gaming device and a mobile device may not be required.

Social Media Presentation Related Methods

Next details of methods in a gaming system involving the generation of a social media presentation are described. FIG. 8 is a method 400 in a wager-based EGM for generating a social media presentation. The method can be implemented as software code executed by a game controller alone or in conjunction with a secondary controller on the EGM, i.e., some or all of the steps can be performed by the game controller. In 402, the outcome to wager-based game can be determined in response to a wager and a signal to initiate the game. For instance, a game controller can generate one or more random numbers that are used to determine the game outcome.

In 404, a presentation for the determined game outcome can be generated. For an EGM with mechanical reels, the presentation can involve spinning mechanical reels from a first position to a second position that indicates the game outcome. In a video EGM, the game outcome presentation can involve rendering a sequence of images that are output to a video display where the sequence of images reveals the game outcome. In 406, the EGM can receive a request for social media information, such as a social media presentation. The request can be initiated from an interface, such as an interface provided on the EGM or an interface on a player's mobile device. In another embodiment, the EGM can be configured to select a game outcome for a social media presentation according to a selection criterion, such as a win amount exceeding a threshold amount or where the selected game outcome occurs with a frequency of less than a threshold probability such as less 1 out of a 100.

In 408, parameters can be received that affect the social media presentation. For instance, the parameters can indicate the types of media, such as still images, video clips and/or audio clips to use in the social media presentation. In 410, social media presentation components can be generated for the selected game. For instance, a still image can be captured from a frame buffer on a video EGM that shows the determined outcome for the selected game. In 412, a social media presentation can be generated from the social media components.

In 414, social media parameters can be received. Social media parameters can include information regarding social media accounts on various social media sites and information that affects how the information will be utilized at a selected social media site. In 416, a social media presentation and/or social media presentation components can be uploaded to one or more of a user's mobile device, a social media site or a remote server. In 418, when uploaded to a remote server, the EGM can generate a notification message that includes information, such as a URL, that allows the social media presentation or social media presentation components to be retrieved from the remote server. For example, a QR code encoding a URL can be output to a display, a link, such as a URL, can be printed on a ticket voucher output from the EGM, or a link can be uploaded to a user's mobile device.

FIG. 9 is a method 500 in a server for generating a social media presentation. In 502, the server can receive game identification information, a determined game outcome and a retrieval identifier from a wager-based EGM. The game identification information may allow the server to locate software that can be used to generate all or a portion of the game outcome presentation for the identified game. In 504, the server can establish communications with a user's mobile device or home computer and receive a request, including the retrieval identifier, to generate a social media presentation. In 506, based upon the received game identification information and the determined game outcome, the server can generate all or a portion of a game outcome presentation that is substantially the same as the game outcome presentation that was generated on the EGM that sent the game identification information and the determined game outcome to the server.

In 508, based upon the generated game outcome presentation, the server can generate social media presentation components that can be used in a social media presentation. In 510, the server can receive first parameters for a social media presentation, such as parameters that affect a formatting of the social media presentation. For instance, the parameters can specify a formatting template to use. In 512, based upon the social media presentation components and the first parameters, the server can generate a first social media presentation.

In 514, the server can receive second parameters for a social media presentation. In 516, based upon the second parameters and the previously generated social media components, the server can generate a social media presentation. In one embodiment, the server can display the first and the second social media presentations in a side by side manner so that a user can select one of the presentations. In 518, the server can receive social media information, such as social media account information and tags. In one embodiment, the server can be configured to generate connections between the user and a gaming operator on a social media site, such as get the user to post they like the gaming operator on their Facebook™ account. Information that the user likes the gaming operator can then show up in a visible portion of the user's account. In 520, the server can upload the first and/or the second social media presentation to a social media site associated with the account information including specified tags and information that allows a connection to be established, such as a "like" on Facebook™.

Gaming System and EGMs

Next additional details of EGMs and gaming systems are described with respect to FIGS. 10 and 11. Communications between a mobile device and an EGM can be enabled by one or more the devices described with respect to FIGS. 10 and 11. In particular, as described above, the communications can be used to display on the EGM a copy of a mobile device screen display. In addition, the gaming system can be configured to allow remote control of a mobile device via inputs received at the EGM. For instance, an application on the mobile device can be launched or affected by inputs received at the EGM and sent to the mobile device.

FIG. 10 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between a gaming device 604 and a mobile device 654, a mobile device 654 may be able to utilize some of the functionality of secondary devices residing on the gaming device 604. For instance, when a mobile device 654 is paired to a gaming device 604, it may be possible for a player to print something from their mobile device 654 using a printer on the gaming device 604.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 11.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 11.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, a receipt indicating the acceptance of a virtual ticket voucher or virtual currency on the gaming device can be displayed in the service window in a QR code format and transferred to a user's portable electronic device via an image capture device on their portable electronic device. In another embodiment, virtual ticket voucher information can be transferred to a portable electronic device as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 11 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 10, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 11, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 11 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. An electronic gaming machine (EGM) comprising:

a secure cabinet;

a display mechanism, coupled to the secure cabinet, for displaying an outcome to a wager-based game played by a player of the EGM;

a value input mechanism for receiving wagering cash or an indicia of wagering credit used wherein the received cash or the indicia of credit are stored within the secure cabinet and used for making wagers on the outcome to the wager-based game;

a value output mechanism for dispensing payout cash or indicia of payout credit from the EGM;

a wireless interface configured for communications with a user-controlled mobile device controlled by the player;

a network interface for communicating with a remote server; and a game controller, including a processor and memory, disposed within the secure cabinet and communicatively coupled to the display mechanism, the value input mechanism, the value output mechanism, the wireless interface and the network interface, the game controller configured to:

determine the outcome to the wager-based game, determine an award associated with the outcome to the wager-based game, generate a presentation that reveals the outcome to the wager-based game including the award, control a plurality of mechanisms including the display mechanism to output the presentation, receive a request for a social media presentation that includes a visual representation of the outcome to the wager-based game including the award, the visual representation similar to the presentation output on the EGM, generate the social media presentation, after generating the social media presentation, determine whether the user-controlled mobile device is already connected to the wireless interface;

when it is determined that the user-controlled mobile device is not connected to the wireless interface, attempt to establish secure communications between the wireless interface and the user-controlled mobile device, and when the attempt to establish the secure communications is unsuccessful, transmit the generated social media presentation to the remote server and provide a record locator to the player, wherein the record locator allows later retrieval of the social media presentation at the EGM or at another EGM in communication with the remote server, wherein the EGM, the another EGM, and the remote server are connected via an internal network.

2. The EGM of claim 1, wherein the display mechanism is a video display.

3. The EGM of claim 1, wherein the display mechanism includes a plurality of mechanical reels.

4. The EGM of claim 1, wherein the display mechanism is a multi-layered video display including two or more video displays aligned with one another such that images displayed on a first video display are visible through a second video display.

5. The EGM of claim 1, wherein the social media presentation includes a credits visual representation of an amount of credits on the EGM prior to the award associated with the game outcome.

6. The EGM of claim 5, wherein the visual representation includes a copy of a video frame output to the display mechanism that shows the amount of credits on the EGM prior to the award.

7. The EGM of claim 1, wherein the social media presentation includes a credits visual representation of an amount of credits on the EGM including the award associated with the game outcome.

8. The EGM of claim 7, wherein the visual representation includes a copy of a video frame output to the display mechanism that shows the amount of credits on the EGM including the award.

9. The EGM of claim 1, wherein the wager-based game includes a base game and a bonus game that is triggered from the base game.

10. The EGM of claim 1, wherein the social media presentation includes a base visual representation of a base outcome to a base game when the bonus game is triggered and a bonus visual representation of a bonus outcome to the bonus game including a bonus award associated with the bonus game.

11. The EGM of claim 10, wherein the base game on a first display mechanism and the bonus game is output on a second display mechanism.

12. The EGM of claim 11, wherein the second display mechanism is a video display and wherein the bonus visual representation of the bonus outcome of the bonus game includes a copy of a frame output to the video display showing the bonus outcome of the bonus game.

13. The EGM of claim 1, wherein the social media presentation includes a second visual representation of the presentation on the EGM prior to revealing the outcome to the wager-based game and the visual representation of the outcome to the wager-based game including the award.

14. The EGM of claim 1, wherein the social media presentation includes the visual representation of the outcome to the wager-based game including the award and a second visual representation including a second outcome of the wager-based game including a second award.

15. The EGM of claim 1, wherein the request for the social media presentation is received from the user-controlled mobile device via the wireless interface.

16. The EGM of claim 1, wherein the request for the social media presentation includes social media account information associated with a social media site.

17. The EGM of claim 16, wherein the game controller is further configured to post the generated social media presentation to the social media site using the social media account information.

18. The EGM of claim 1, wherein the EGM is configured to receive one or more parameters that affect how the social media presentation is viewed when it is posted to a social media site.

19. The EGM of claim 1, wherein the game controller is further configured to display a list of messages including text, to receive a selection of one of the messages from the list of messages and to generate the social media presentation including the selected one of the messages.

20. The EGM of claim 1, wherein the game controller is further configured to receive a message including text and incorporate the text into the generated social media presentation.

21. The EGM of claim 20, wherein the message is received from one of the user-controlled mobile device or the remote server.

22. The EGM of claim 1, wherein the generated social media presentation includes a video clip or a link to the video clip of the presentation that shows the outcome to the wager-based game being revealed on the EGM.

23. The EGM of claim 1, wherein the game controller is further configured to receive formatting instructions for the social media presentation and generate the social media presentation according to the formatting instructions.

24. The EGM of claim 23, wherein the formatting instructions are received as a selection of a formatting template.

25. The EGM of claim 23, wherein the formatting instructions include a selection of a theme.

26. The EGM of claim 25, wherein the theme is related to a holiday, an event or a theme associated with a casino.

27. The EGM of claim 1, wherein the game controller is configured to receive a user's name and to generate the social media presentation including the user's name.

28. The EGM of claim 1, wherein the game controller is configured to receive the request for the social media presentation from the remote server.

29. The EGM of claim 1, wherein the game controller is further configured to generate the social media presentation including one or more of a time when the wager-based game is played, a date when the wager-based game is played, a name of a place where the wager-based game is played or a name of a gaming establishment where the wager-based game is played.

30. The EGM of claim 1, wherein the gaming controller is configured to receive a request to establish a social media connection on a social media site between a person that played the wager-based game and an operator of a gaming establishment where the wager-based game is played.

31. A method in an EGM including a game controller, the method comprising:

determining in the game controller an outcome to a wager-based game played by a player of the EGM, determining in the game controller an award associated with the outcome to the wager-based game;

generating in the game controller a presentation that reveals the outcome to the wager-based game including the award;

generating in the game controller a plurality of instructions for controlling a plurality of mechanisms including a display mechanism to output the presentation;

receiving in the game controller a request for a social media presentation that includes a visual representation of the outcome to the wager-based game including the award, the visual representation similar to the presentation output on the EGM;

generating in the game controller the social media presentation;

in response to generating the social media presentation, determining whether a user-controlled mobile device is already connected to the game controller of the EGM;

when it is determined that the user-controlled mobile device is not connected to the game controller, attempting to establish secure electronic communications between the game controller and the user-controlled mobile device controlled by the player; and when the attempt to establish the secure communications is unsuccessful, transmitting the generated social media presentation to a remote server and providing a record locator to the player, wherein the record locator allows later retrieval of the social media presentation at the EGM or at another EGM in communication with the remote server, wherein the EGM, the another EGM, and the remote server are connected via an internal network.

32. A non-transitory computer readable medium for tangibly storing a computer program used by a processor on an EGM, the computer readable medium comprising:

computer code for determining an outcome to a wager-based game played by a player of the EGM;

computer code for determining an award associated with the outcome to the wager-based game;

computer code for generating a presentation that reveals the outcome to the wager-based game including the award;

computer code for generating a plurality of instructions for controlling a plurality of mechanisms including a display mechanism to output the presentation;

computer code for receiving a request for a social media presentation that includes a visual representation of the outcome to the wager-based game including the award, the visual representation similar to the presentation output on the EGM;

computer code for generating the social media presentation;

computer code for determining whether a user-controlled mobile device is connected to the processor in response to generating the social media presentation;

computer code for attempting to establish secure electronic communications between the processor and the user-controlled mobile device controlled by the player when it is determined that the user-controlled mobile device is not connected to the processor; and computer code for transmitting the generated social media presentation to a remote sever and providing a record locator to the player if the attempt to establish the secure communications is unsuccessful, wherein the record locator allows later retrieval of the social media presentation at the EGM or at another EGM in communication with the remote server, wherein the EGM, the another EGM, and the remote server are connected via an internal network.

* * * * *

UNITED STATES PATENT AND TRADEMARK OFFICE

CERTIFICATE OF CORRECTION

PATENT NO. : 8,827,814 B2
APPLICATION NO. : 13/333669
DATED : September 9, 2014
INVENTOR(S) : Steven G. Lemay et al.

It is certified that error appears in the above-identified patent and that said Letters Patent is hereby corrected as shown below:

IN THE CLAIMS

In Claim 1, Column 40, Line 56, before "cash" insert --wagering--.
In Claim 1, Column 40, Line 56, between "of" and "credit" insert --wagering--.
In Claim 5, Column 41, Line 47, before "game" insert --wager-based--.
In Claim 6, Column 41, Line 48, between the second instance of "the" and "visual" insert --credits--.
In Claim 7, Column 41, Line 55, before "game" insert --wager-based--.
In Claim 8, Column 41, Line 56, between the second instance of "the" and "visual" insert --credits--.
In Claim 10, Column 41, Line 65, replace "the" with --a--.
In Claim 11, Column 42, Line 1, between "game" and "on" insert --is output--.
In Claim 21, Column 42, Line 43, replace "or" with --and--.
In Claim 27, Column 42, Line 60, replace "a" with --the--.
In Claim 29, Column 43, Line 2, replace "or" with --and--.

Signed and Sealed this
Twenty-second Day of March, 2016

Michelle K. Lee

Michelle K. Lee
*Director of the United States Patent and Trademark Office*